US009072964B2

(12) United States Patent
Nakada et al.

(10) Patent No.: US 9,072,964 B2
(45) Date of Patent: Jul. 7, 2015

(54) INFORMATION PROCESSING PROGRAM AND INFORMATION PROCESSING APPARATUS

(75) Inventors: Ryuichi Nakada, Kyoto (JP); Takeshi Ando, Kyoto (JP); Masayuki Taira, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 517 days.

(21) Appl. No.: 12/633,357

(22) Filed: Dec. 8, 2009

(65) Prior Publication Data

US 2011/0061059 A1 Mar. 10, 2011

(30) Foreign Application Priority Data

Sep. 7, 2009 (JP) ................................ 2009-205656

(51) Int. Cl.
*G06F 3/00* (2006.01)
*A63F 13/00* (2014.01)
*G06F 9/54* (2006.01)

(52) U.S. Cl.
CPC ................ *A63F 13/00* (2013.01); *G06F 9/544* (2013.01); *A63F 2300/208* (2013.01); *A63F 2300/209* (2013.01); *A63F 2300/554* (2013.01)

(58) Field of Classification Search
None
See application file for complete search history.

(56) References Cited

U.S. PATENT DOCUMENTS

| 5,255,387 | A | 10/1993 | Arnold et al. |
| 6,256,714 | B1 * | 7/2001 | Sampsell et al. ............... 711/154 |
| 7,731,590 | B2 | 6/2010 | Azuma |
| 2002/0095663 | A1 * | 7/2002 | Joory .............................. 717/136 |
| 2003/0093575 | A1 * | 5/2003 | Upton ............................. 709/310 |
| 2004/0194112 | A1 * | 9/2004 | Whittenberger et al. ...... 719/310 |
| 2009/0055597 | A1 * | 2/2009 | Robles ........................... 711/147 |
| 2009/0258712 | A1 * | 10/2009 | Tanaka ............................. 463/43 |
| 2010/0087181 | A1 * | 4/2010 | Chen et al. ..................... 455/418 |
| 2010/0190555 | A1 * | 7/2010 | Dutilly et al. .................... 463/43 |

FOREIGN PATENT DOCUMENTS

| JP | 4-229355 | 8/1992 |
| JP | 2004-192447 A | 7/2004 |
| JP | 2006-277403 A | 10/2006 |
| JP | 2007-190203 A | 8/2007 |
| JP | 2008-183066 | 8/2008 |

\* cited by examiner

*Primary Examiner* — Kenneth Tang
(74) *Attorney, Agent, or Firm* — Nixon & Vanderhye P.C.

(57) ABSTRACT

In an information processing apparatus stores, save data shared among first-third applications is stored in a memory for saved data by bringing it into correspondence with the first-third applications as first-third data. A computer integrates the first-third data stored in the memory for saved data within a main memory when the first application is activated, for example, and updates the integration data in accordance with execution of the first application and overwrites the first data and second data stored in the memory for saved data with the updated integration data in response to an automatic saving instruction or a saving instruction by a user at the same time.

25 Claims, 18 Drawing Sheets

FIG. 6
(A)
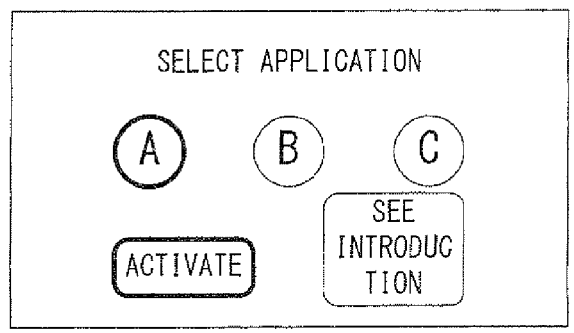
(B)
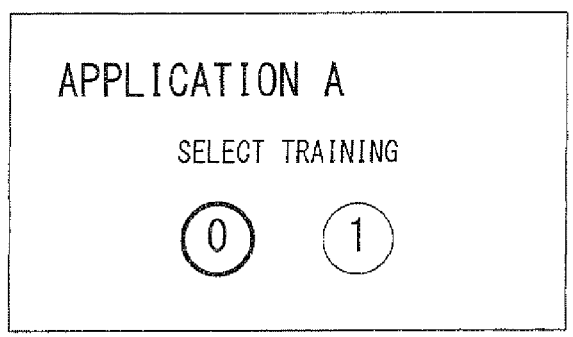
(C)
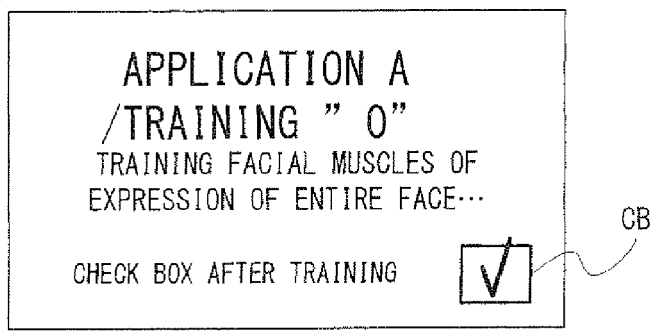
(D)
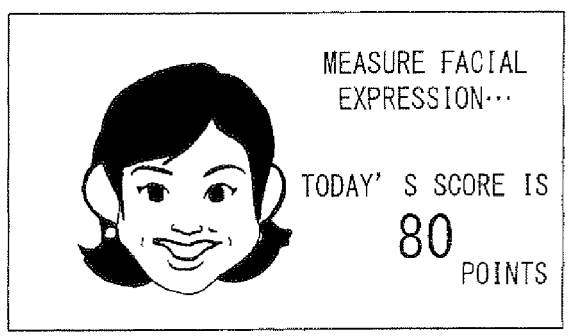

FIG. 7 (A) (MEMORY FOR SAVED DATA) 52
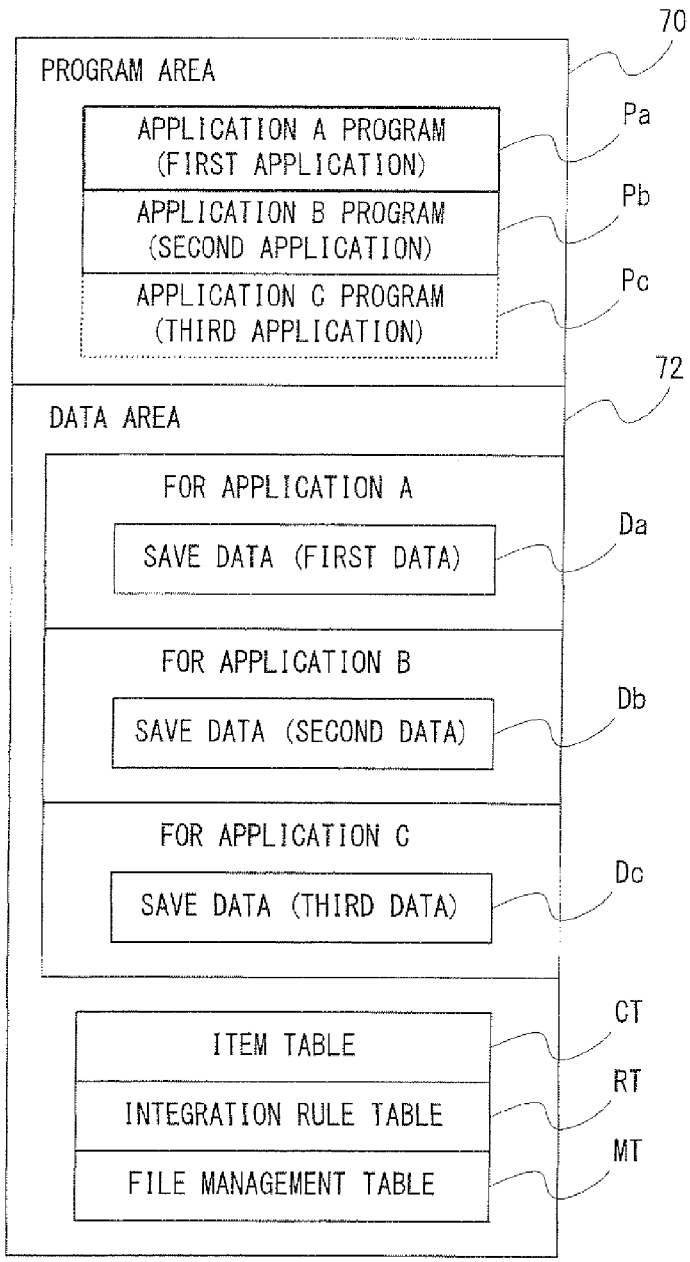
(B) (MAIN MEMORY) 48
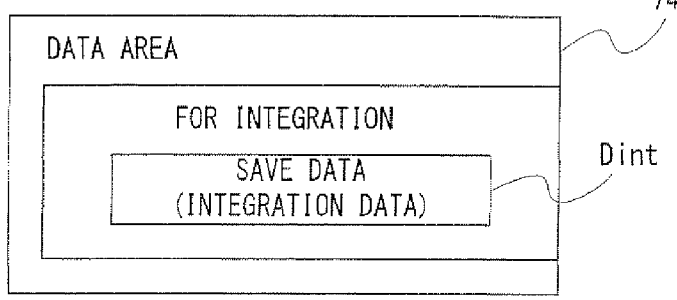

FIG. 8

(SAVE DATA)      Da-Dc, Dint

| FILE 1 | ITEM 1 : SAVE DATA | (UPDATED DATE AND TIME DATA NONE) |
| | ITEM 2 : SAVE DATA | |
| | ITEM 3 : SAVE DATA | |
| FILE 2 | ITEM 4 : SAVE DATA | – |
| | ITEM 5 : SAVE DATA | |
| | ITEM 6 : SAVE DATA | |
| | ITEM 7 : SAVE DATA | |
| FILE 3 | ITEM 8 : SAVE DATA | – |
| | ITEM 9 : SAVE DATA | |
| | ITEM 10 : SAVE DATA | |
| FILE 4 | ITEM 11 : SAVE DATA | – |
| | ITEM 12 : SAVE DATA | |
| | ITEM 13 : SAVE DATA | |
| ⋮ | ⋮ | |
| FILE 9 | ITEM 29 : SAVE DATA | – |
| | ITEM 30 : SAVE DATA | |
| | ITEM 31 : SAVE DATA | |
| FILE 10 | ITEM 32 : SAVE DATA | – |
| FILE 11 | ITEM 33 : SAVE DATA | – |
| ⋮ | ⋮ | |
| FILE 16 | ITEM 38 : SAVE DATA | – |
| FILE 17 | ITEM 39 : SAVE DATA | – |
| FILE 18 | ITEM 40 : SAVE DATA | FILE UPDATED DATE AND TIME DATA |
| FILE 19 | ITEM 41 : SAVE DATA | FILE UPDATED DATE AND TIME DATA |

FIG. 9 (ITEM TABLE) CT

| ITEM | CONTENT | SUBSTANCE | REFERENCE APPLICATION | UPDATING APPLICATION | INTEGRATION RULE |
|---|---|---|---|---|---|
| 1 | WHETHER OR NOT INTRODUCTION OF APPLICATION A IS SEEN | FLAG | A | A | R3 |
| 2 | WHETHER OR NOT INTRODUCTION OF APPLICATION B IS SEEN | FLAG | B | B | R3 |
| 3 | WHETHER OR NOT INTRODUCTION OF APPLICATION C IS SEEN | FLAG | C | C | R3 |
| 4 | WHETHER OR NOT TRAINING 0 IS PERFORMED EVEN ONCE | FLAG | A, B, C | A, B, C | R3 |
| 5 | WHETHER OR NOT TRAINING 1 IS PERFORMED EVEN ONCE | FLAG | A | A | R3 |
| 6 | WHETHER OR NOT TRAINING 2 IS PERFORMED EVEN ONCE | FLAG | B | B | R3 |
| 7 | WHETHER OR NOT TRAINING 3 IS PERFORMED EVEN ONCE | FLAG | C | C | R3 |
| 8 | WHETHER CHECK OR NOT AS TO WHETHER OR NOT TRAINING IS PERFORMED BY APPLICATION A ON FIRST DAY | FLAG | A, B, C | A | R3 |
| 9 | WHETHER CHECK OR NOT AS TO WHETHER OR NOT TRAINING IS PERFORMED BY APPLICATION B ON FIRST DAY | FLAG | A, B, C | B | R3 |
| 10 | WHETHER CHECK OR NOT AS TO WHETHER OR NOT TRAINING IS PERFORMED BY APPLICATION C ON FIRST DAY | FLAG | A, B, C | C | R3 |
| 11 | WHETHER CHECK OR NOT AS TO WHETHER OR NOT TRAINING IS PERFORMED BY APPLICATION A ON SECOND DAY | FLAG | A, B, C | A | R3 |
| 12 | WHETHER CHECK OR NOT AS TO WHETHER OR NOT TRAINING IS PERFORMED BY APPLICATION B ON SECOND DAY | FLAG | A, B, C | B | R3 |
| 13 | WHETHER CHECK OR NOT AS TO WHETHER OR NOT TRAINING IS PERFORMED BY APPLICATION C ON SECOND DAY | FLAG | A, B, C | C | R3 |
| 29 | WHETHER CHECK OR NOT AS TO WHETHER OR NOT TRAINING IS PERFORMED BY APPLICATION A ON SEVENTH DAY | FLAG | A, B, C | A | R3 |
| 30 | WHETHER CHECK OR NOT AS TO WHETHER OR NOT TRAINING IS PERFORMED BY APPLICATION B ON SEVENTH DAY | FLAG | A, B, C | B | R3 |
| 31 | WHETHER CHECK OR NOT AS TO WHETHER OR NOT TRAINING IS PERFORMED BY APPLICATION C ON SEVENTH DAY | FLAG | A, B, C | C | R3 |
| 32 | SCORE ON FIRST DAY | SCORE | A, B, C | A, B, C | R4 |
| 33 | SCORE ON SECOND DAY | SCORE | A, B, C | A, B, C | R4 |
| 38 | SCORE ON SEVENTH DAY | SCORE | A, B, C | A, B, C | R4 |
| 39 | PHOTOGRAPH MANAGING INFORMATION | IMAGING DATE AND TIME AND IMAGING NUMBER | A, B, C | A, B, C | R5 |
| 40 | WHETHER OR NOT LAST TRAINING DAY IS TODAY | FLAG | A, B, C | A, B, C | R1 |
| 41 | DATE AND TIME AT LAST WARM-UP | DATE AND TIME | A, B, C | A, B, C | R2 |

FIG. 10

(INTEGRATION RULE TABLE)   RI

| FILE ATTRIBUTE | SUBSTANCE OF ITEM | | RULE OF INTEGRATION |
|---|---|---|---|
| UPDATED DATE AND TIME DATA IS INCLUDED | FLAG | R1 | NEWEST DATA IS ADOPTED NOTED THAT IF THERE IS DATA HAVING DATE AND TIME AS THAT OF NEWEST DATA, FLAG SET IN SAME DATE DATA IS SET |
| | THING OTHER THAN FLAG | R2 | NEWEST DATA IS ADOPTED |
| UPDATED DATE AND TIME DATA IS NOT INCLUDED | FLAG | R3 | IF ANY FLAG IS SET, FLAG IS SET |
| | SCORE | R4 | IF THERE IS DIFFERENT SCORE WITH SAME DATE, BEST SCORE IS ADOPTED |
| | PHOTOGRAPH MANAGING INFORMATION | R5 | ADOPT ACCORDING TO OR=LOGICAL SUM NOTED THAT IF THERE IS DIFFERENT PHOTOGRAPH WITH SAME PHOTOGRAPH IMAGING INFORMATION, NO PHOTOGRAPH IS ADOPTED (RECREATE) |

FIG. 11 (APPLICATION EXAMPLE OF INTEGRATION RULE)

| ITEM | Da | Db | Dc | INTEGRATION RULE | Dint |
|---|---|---|---|---|---|
| 1 | FLAG:ON | FLAG:OFF | FLAG:OFF | R3 | FLAG:ON |
| 2 | FLAG:OFF | FLAG:OFF | FLAG:OFF | R3 | FLAG:OFF |
| ... | | | | | |
| 32 | SCORE : 80 | SCORE : 75 | SCORE : 85 | R4 | SCORE : 85 |
| ... | | | | | |
| 39 | NUMBER : #1-#12 | NUMBER : #2-#13 | NUMBER : #1-#13 | R5 | NUMBER : #1-#13 NOTED THAT IF THREE SHEETS OF PHOTOGRAPHS IDENTIFIED WITH #2 ARE NOT SAME, #2 IS NOT ADOPTED |
| 40 | FLAG:OFF (2009_8_1_15:00) | FLAG:ON (2009_8_15_11:00) | FLAG:OFF (2009_8_20_12:00) | R1 | FLAG:OFF (2009_8_20_12:00) |
| (40) | FLAG:OFF (2009_8_1_15:00) | FLAG:ON (2009_8_20_11:00) | FLAG:OFF (2009_8_20_12:00) | R1 | FLAG:ON (2009_8_20_12:00) |
| 41 | DATE AND TIME : 2009_8_1_16:00 | NULL | DATE AND TIME : 2009_8_20_11:00 | R2 | DATE AND TIME : 2009_8_20_11:00 |

FIG. 12

(A) (FILE MANAGEMENT TABLE)  MT (12:00 p.m. AUGUST 20, 2009 AS OF CURRENT DATE : BEFORE CONTROL)

| FILE | SAVE DATA Da | | SAVE DATA Db | | SAVE DATA Dc | |
|---|---|---|---|---|---|---|
| | STATE | UPDATED DATE AND TIME | STATE | UPDATED DATE AND TIME | STATE | UPDATED DATE AND TIME |
| 1 | NORMAL | - | NORMAL | - | - | - |
| 2 | NORMAL | - | CORRUPTION | - | NORMAL | - |
| 3 | CORRUPTION | - | NULL | - | NULL | - |
| ... | | | | | | |
| 18 | NORMAL | 2009_8_1_15:00 | NORMAL | 2009_8_15_10:00 | NORMAL | 2009_8_20_13:00 (FUTURE AND SAME DAY) |
| 19 | NORMAL | 2009_8_1_16:00 | NORMAL | 2009_8_21_11:00 (FUTURE AND NEXT DAY ONWARD) | NORMAL | 2009_8_20_11:00 |

(B) (FILE MANAGEMENT TABLE)  MT (12:00 p.m. AUGUST 20, 2009 AS OF CURRENT DATE : AFTER CONTROL)

| FILE | SAVE DATA Da | | SAVE DATA Db | | SAVE DATA Dc | |
|---|---|---|---|---|---|---|
| | STATE | UPDATED DATE AND TIME | STATE | UPDATED DATE AND TIME | STATE | UPDATED DATE AND TIME |
| 1 | NORMAL | - | NORMAL | - | - | - |
| 2 | NULL | - | NULL | (FILE ERASURE IS NOT PERFORMED) | NORMAL | - |
| 3 | NULL | (ERASE FILE) | NULL | (SAVE DATA IS INVALIDATED) | NULL | - |
| ... | | | | | | |
| 18 | NORMAL | 2009_8_1_15:00 | NORMAL | 2009_8_15_10:00 | NORMAL | 2009_8_20_12:00 (SAVE DATA IS VALIDATED) |
| 19 | NORMAL | 2009_8_1_16:00 | NULL | (SAVE DATA IS INVALIDATED) | NORMAL | 2009_8_20_11:00 |

INFORMATION PROCESSING PROGRAM AND INFORMATION PROCESSING APPARATUS

CROSS REFERENCE OF RELATED APPLICATION

The disclosure of Japanese Patent Application No. 2009-205656 is incorporated herein by reference.

BACKGROUND OF THE INVENTION

1. Field of the Invention

The present invention relates to an information processing program and an information processing apparatus. More specifically, the present invention relates to an information processing program and an information processing apparatus which share information like save data among a plurality of applications (software).

2. Description of the Related Art

As a background art of such a kind, the document disclosed in Japanese Patent Application Laid-Open No. 2008-183066 is known, for example. In the background art, among a series of software, save data of old software can be used in new software, and save data of new software can be used in the old software. More specifically, when certain software is activated, whether or not there is save data of another software is determined, and if there is the save data, the information in relation to the save data is displayed to make a user select the save data to be used.

However, in the aforementioned background art, even old save data may remain indefinitely, so that there are problems that the user erroneously selects the old save data, and the user requires a confirmation process of a created date and time and a updated date and time of the save data.

SUMMARY OF THE INVENTION

Therefore, it is a primary object of the present invention to provide a novel information processing program and a novel information processing apparatus.

Another object of the present invention is to provide an information processing program and an information processing apparatus which are able to keep information like save data shared among a plurality of applications up-to-date without complex operations.

The present invention adopts following configuration in order to solve the above-described problems.

A first invention is an information processing program causing a computer connected to a storing means to function as an application executing means, an updating means, and a first overwriting means. The storing means stores data at least a part of which is shared with a first application and a second application as first data by bringing it into correspondence with the first application and as second data by bringing it into correspondence with the second application. That is, the data is stored as two ways, such as the first data for the first application and the second data for the second application. The application executing means executes a first application by predetermined data. The updating means updates the predetermined data in accordance with execution of the first application by the application executing means. The first overwriting means overwrites the first data and the second data which are stored in the storing means with the predetermined data updated by the updating means.

According to the first invention, the predetermined data updated in accordance with execution of the first application is overwritten with the first data corresponding to the first application and the second data corresponding to the second application, so that it is possible to keep the first data and the second data up to date without complex operations.

A second invention is an information processing program according to the first invention, and causes a computer to further function as an integrating means, and the application executing means executes the first application by integration data integrated by the integrating means. The integrating means integrates the first data and the second data which are stored in the storing means. The first application is executed according to the integration data thus integrated.

According to the second invention, the first data and second data which were updated by execution of a previous first application and second application are integrated, the integration data is updated in accordance with execution of the first application, and the updated data is overwritten with the first data and the second data, so that the first data and second data can be made such that the previous execution result of the application is reflected. In addition, even if any one of the overwritten first data and second data is erased or corrupted, each application can be made by utilizing one of the data which is kept up to date.

A third invention is an information processing program according to the first invention, and the first overwriting means overwrites the first data and the second data stored in the storing means by the predetermined data updated by the updating means in response to a predetermined instruction.

According to the third invention, it is possible to keep the first data and the second data up to date at a proper timing.

It is preferable that the storing means includes a memory for saved data, such as a nonvolatile memory like a flash memory, etc., and each of the integrating and the updating processing is performed on a volatile memory, such as a main memory connected to the computer or a computer built-in memory. Here, under certain circumstances, each of the integrating and the updating processing may be performed within the storing means.

A fourth invention is an information processing program according to the second invention, and causes the computer to further function as an activating means, and the integrating means performs integration when the first application is activated by the activating means. The activating means activates the first application, and the integrating means performs integration when the first application is activated by the activating means.

According to the fourth invention, when the first application is activated, the first data and the second data are integrated, so that it is possible to start execution of the first application by the newest data.

A fifth invention is an information processing program according to the fourth invention, and causes the computer to further function as a second overwriting means. The second overwriting means overwrites the first data and the second data stored in the storing means with the integration data integrated by the integrating means when the first application is activated, before execution of the first application is started.

According to the fifth invention, when the first application is activated, the first data and the second data are integrated, and the integration result is quickly reflected on the first data and the second data, so that even if the application is ended in accordance with the computer being turned off before the integration data updated in accordance with execution of the first application is updated with the first data and the second data, it is possible to change the first data and the second data to the integrated new data.

A sixth invention is an information processing program according to the fifth invention, and the first and/or the second overwriting means overwrites a part different from the integration data integrated by the integrating means out of the first data and/or the second data stored in the storing means.

According to the sixth invention, it is possible to perform efficient overwriting.

A seventh invention is an information processing program according to any one of the second to the sixth inventions, and a shared part of the data is divided into a plurality of items, and the integrating means integrates the first data and the second data for each item.

According to the seventh invention, a different integration rule can be applied depending on the items, so that it is possible to implement various integrations.

An eighth invention is an information processing program according to the seventh invention, and each of the plurality of items belongs to any one of a plurality of groups to each of which one file is assigned, and the first and/or the second overwriting means overwrites the first data and the second data by a file unit.

According to the eighth invention, the items are grouped and stored in the files, and the overwriting is made to be performed by a file unit, so that this makes it easy to improve efficiency of the overwriting and use the flash memory as a storing means.

A ninth invention is an information processing program according to the eighth invention, and the first and/or the second overwriting means determines whether or not a change occurs for all items included in each of the plurality of groups, and performs overwriting on the file corresponding to the group including at least one item for which a determination result is affirmative.

According to the ninth invention, it is possible to perform overwriting efficiently.

A tenth invention is an information processing program according to the eighth or the ninth invention, and the integrating means performs integration according to a rule corresponding to an attribute of each file and/or a substance of each item.

According to the tenth invention, it is possible to efficiently perform various kinds of integration.

An eleventh invention is an information processing program according to the tenth invention, and the attribute is as to whether or not each file includes updated-date-and-time data, and the rule includes a newest adopting rule of adopting data of a newest file if each file includes the updated-date-and-time data.

According to the eleventh invention, the newest data is adopted at a time of the integration, and therefore, it is possible to remove old data from the first data and the second data.

A twelfth invention is an information processing program according to the tenth invention, and the rule includes a flag rule of setting, in a case that the substance of the item is a flag in relation to proceeding of an application, the flag if the flag is set in any one of data.

A thirteenth invention is an information processing program according to the tenth invention, and the rule includes a best value rule of adopting a best value in a case that the substance of the item is a value.

A fourteenth invention is an information processing program according to the tenth invention, and the rule includes a logical sum rule of perform adopting according to a logical sum in a case that the substance of the item is management information of data.

According to the fourteenth invention, it is possible to adopt the management information without omission.

A fifteenth invention is an information processing program according to the fourteenth invention, and the logical sum rule is attached with a condition that if there is different data of the same management information, no data is adopted.

In the fifteenth invention, in a case that the data is different irrespective of each data being assigned the same management information (in a case of different image data with the same photograph managing information, for example), no management information is adopted.

According to the fifteenth invention, it is possible to remove the management information having a probability of being mistaken.

A sixteenth invention is an information processing program according to the third invention, and the predetermined instruction includes an automatic saving instruction.

In the sixteenth invention, the overwriting is executed according to the automatic saving instruction.

According to the sixteenth invention, the user is not required to perform a saving instruction, so that the operation amount is reduced.

Here, the predetermined instruction may include a saving instruction by the user. In this case, the overwriting is executed according to the saving instruction by the user. Accordingly, the overwriting is not performed until the user makes the instruction, so that it is possible to reduce a load on the computer and the storing means.

A seventeenth invention is an information processing program according to the first invention, and the data is data indicating a parameter being in relation to and changing in accordance with execution of each of the first application and the second application.

An eighteenth invention is an information processing program according to the second invention, and causes the computer to further function as a controlling means. The controlling means controls the integrating means such that in a case that abnormality occurs to the first data stored in the storing means, the abnormality is restored by utilizing the second data stored in the storing means.

According to the eighteenth invention, it is possible to restore the abnormality through the integration.

A nineteenth invention is an information processing program according to the eighteenth invention, and the controlling means includes a date-and-time controlling means for changing, in a case that updated-date-and-time data corresponding to the first data is a future and a same day with respect to a current date and time, the updated-date-and-time data so as to indicate the current date and time, and invalidating the first data in a case that the updated-date-and-time data indicates a future and a next day onward.

According to the nineteenth invention, even if the date and time indicated by the updated-date-and-time data is the future, if only it is the current day, the updated-date-and-time data is limited to be changed so as to indicate the current date and time, and if the date and time indicated by the updated-date-and-time data is after the next day onward, the first data itself is invalidated, so that it is possible to perform integration making use of the data on the current day.

A twentieth invention is an information processing apparatus comprising: a storing means for storing data at least a part of which is shared with a first application and a second application as first data by bringing it into correspondence with the first application and as second data by bringing it into correspondence with the second application; an application executing means for executing the first application with predetermined data; an updating means for updating the predetermined data in accordance with execution of the first application by the application executing means; and a first overwriting means for updating the first data and the second data stored in the storing means with the predetermined data updated by the updating means.

A twenty-first invention is an information processing method for an information processing apparatus having a storing means for storing data at least a part of which is shared with a first application and a second application as first data by bringing it into correspondence with the first application and as second data by bringing it into correspondence with the second application, comprises: an application executing step for executing the first application by predetermined data; an updating step for updating the predetermined data in accordance with execution of the first application by the application executing step; and a first overwriting step for overwriting the first data and the second data which are stored in the storing means with the predetermined data updated by the updating step.

In the twentieth and the twenty-first inventions as well, similar to the first invention, it is possible to keep the first data and the second data up to date without complex operations.

According to the present invention, it is possible to implement the information processing program and the information processing apparatus which are able to keep the information, such as save data shared among the plurality of applications up to date without complex operations.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3(A) shows one side surface in a close state, FIG. 3(B) shows a top surface in the close state, FIG. 3(C) shows the other side surface in the close state, and FIG. 3(D) shows a bottom surface in the close state;

FIG. 6 is an illustrative view explaining a flow of a facial training, FIG. 6(A) shows an application selection screen, FIG. 6(B) shows a facial training selection screen, FIG. 6(C) shows a facial training screen, and FIG. 6(D) shows a facial expression measuring screen;

FIG. 7 is an illustrative view showing a memory map of the game apparatus, FIG. 7(A) shows a part of a memory for saved data, and FIG. 7(B) shows a part of a main memory;

FIG. 8 is an illustrative view showing a configuration example of save data;

FIG. 9 is an illustrative view showing a configuration example of an item table;

FIG. 10 is an illustrative view showing a configuration example of an integration rule table;

FIG. 11 is an illustrative view showing an application example of the integration rule to items;

FIG. 12 is an illustrative view showing one example of a configuration and a control of the file management table, and FIG. 12(A) corresponds to before-control and FIG. 12(B) corresponds to after-control;

DETAILED DESCRIPTION OF THE PREFERRED EMBODIMENTS

Figure 1:
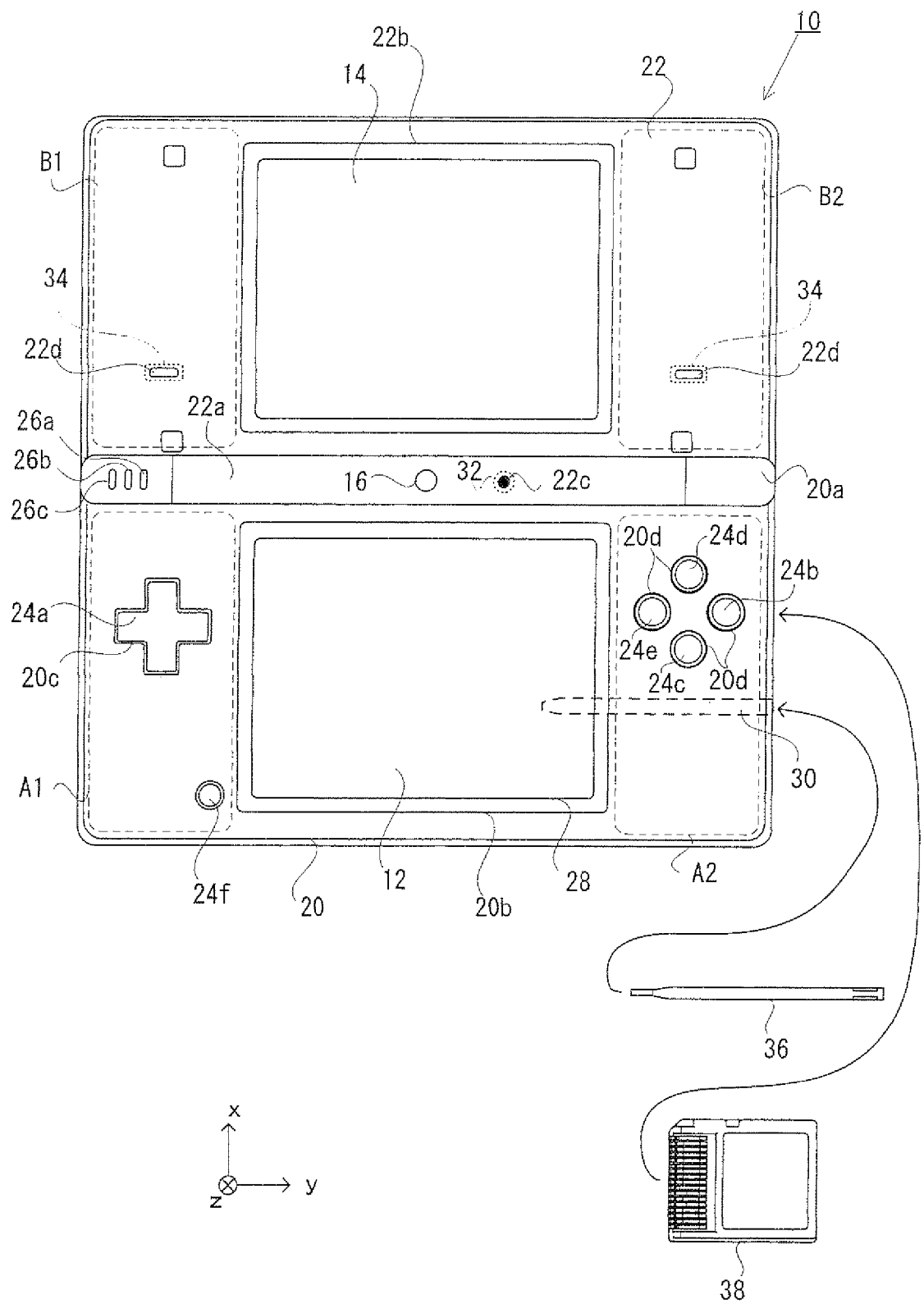
FIG. 1 is an external view of a game apparatus of one embodiment of the present invention to show a front surface thereof in an open state.
Figure 2:
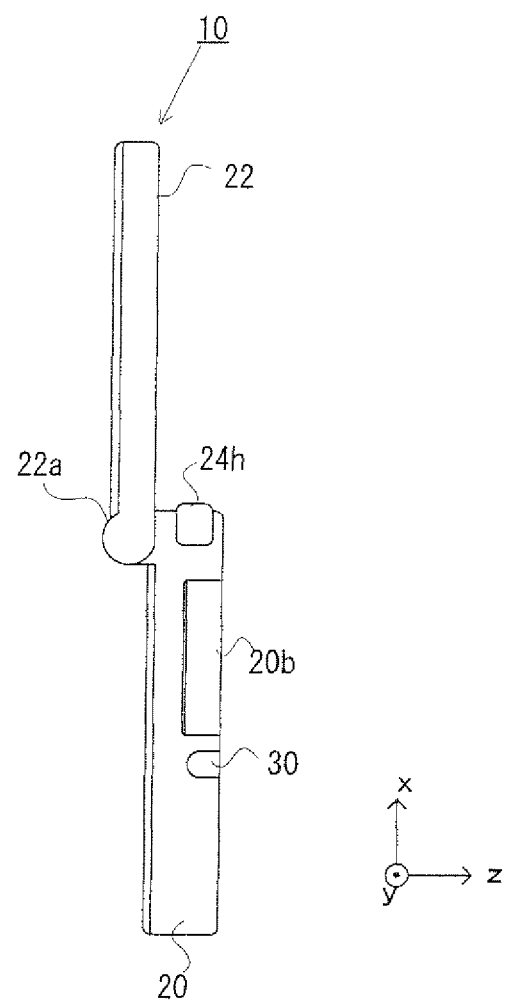
FIG. 2 is an external view of the game apparatus to show a side surface thereof in the open state.
Figure 3:
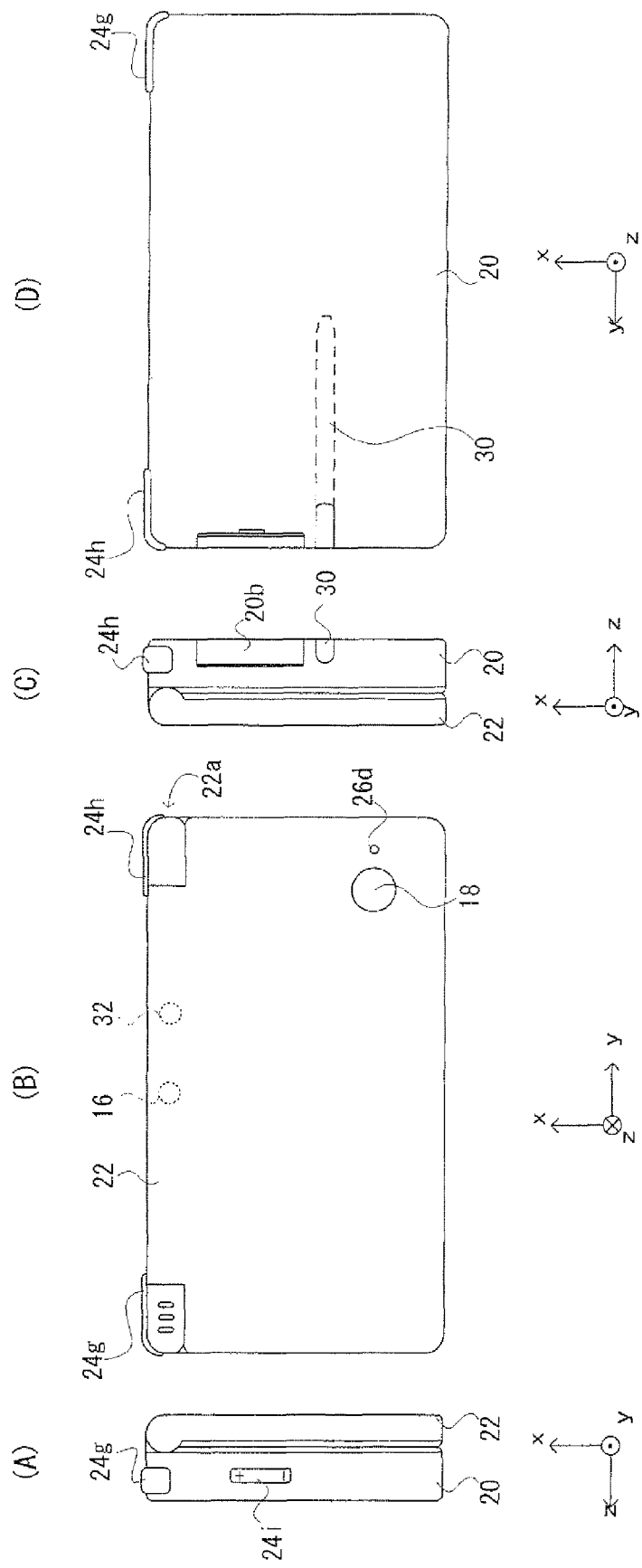
FIG. 3 is an external view of the game apparatus.

In FIG. 1-FIG. 3, an external view of the game apparatus 10 of one embodiment of the present invention is shown. The game apparatus 10 is a foldable game apparatus, and each of FIG. 1 and FIG. 2 shows the game apparatus 10 in a opened state (open state), and FIG. 3 shows the game apparatus 10 in a closed state (close state). Furthermore, FIG. 1 is a front view of the game apparatus 10 in the open state, and FIG. 2 is a side view of the game apparatus in the open state. The game apparatus 10 has two displays (LCDs 12 and 14) and two cameras (cameras 16 and 18), can image images with the cameras, display the imaged images on the screens, and store the data of the imaged images.

The game apparatus 10 is constructed small enough to be held by the user with both hands or one hand of a user even in the open state.

The game apparatus 10 has two housings of a lower housing 20 and an upper housing 22. The lower housing 20 and the upper housing 22 are connected with each other so as to be opened or closed (foldable). In this embodiment, the respective housings 20 and 22 are formed in the form of plate of a horizontally long rectangular, and are rotatably connected with each other at the long sides of both of the housings.

The upper housing 22 is pivotally supported at a part of the upper side of the lower housing 20. This makes the game apparatus 10 to take the close state (the angle formed by the lower housing 20 and the upper housing 22 is about 0° (see FIG. 3)) and the open state (the angle formed by the lower housing 20 and the upper housing 22 is about 180° (see FIG. 2)). The user generally uses the game apparatus 10 in the open state, and keeps the game apparatus 10 in the close state when not using the game apparatus 10. Furthermore, the game apparatus 10 can maintain the angle formed by the lower housing 20 and the upper housing 22 at an arbitrary angle between the close state and the open state by friction, etc. exerted on the hinge as well as the close state and the open state as described above. That is, the upper housing 12 can be fixed with respect to the lower housing 14 at an arbitrary angle.

The configuration of the lower housing 20 is first explained. As shown in FIG. 1, the game apparatus 10 has the lower LCD (liquid crystal display) 12. The lower LCD 12 takes a horizontally-long shape, and is arranged such that the direction of the long side is coincident with the long side of the lower housing 20. The lower LCD 12 is housed in the lower housing 20. The lower LCD 12 is provided on an inner surface of the lower housing 20. Accordingly, if the game apparatus 10 is not to be used, the game apparatus 10 is in the close state to thereby prevent the screen of the lower LCD 12 from being soiled, damaged, and so forth. Additionally, in this embodiment, an LCD is used as a display, but other arbitrary displays, such as a display utilizing EL (Electro Luminescence), for example, may be used. Furthermore, the game apparatus 10 can employ a display of an arbitrary resolution. Additionally, in a case that the game apparatus 10 is used as an imaging device, the lower LCD 12 is mainly used for displaying, in real time, images (through image) imaged by the camera 16 or 18.

The inner surface of the lower housing 20 is formed to be approximately planar. At the center of the inner surface, an opening 20b for exposing the lower LCD 12 is formed. At the left of the opening 20b (in the negative direction of the y axis in the drawing), an opening 20c is formed, and at the right of the opening 20b, an opening 20d is formed. The openings 20b and 20c are for exposing the respective keytops (the top surfaces of the respective buttons 24a-24e). Then, the screen of the lower LCD 12 provided inside the lower housing 20 is exposed from the opening 20b, and the respective keytops are exposed from the openings 20c and 20d. Thus, on the inner surface of the lower housing 20, on both sides of the opening 20b for the lower LCD 12 set at the center, non-screen areas (dotted line areas A1 and A2 shown in FIG. 1. More specifically, areas for arranging the respective buttons 24a-24e; button arranging area) are provided.

On the lower housing 20, the respective buttons 24a-24i and a touch panel 28 are provided as an input device. As shown in FIG. 1, the direction input button 24a, the button 24b, the button 24c, the button 24d, the button 24e, and the power button 24f out of the respective buttons 24a-24i are provided on the inner surface of the lower housing 20. The direction input button 24a is utilized for a selecting operation, for example, and the respective buttons 24b-24e are utilized for a decision operation and a cancel operation, for example. The power button 24f is utilized for turning on/off the power of the game apparatus 10. Here, the direction input button 24a and the power button 24f are provided on one side (left side in FIG. 1) of the lower LCD 12 provided at substantially the center of the lower housing 20, and the buttons 24b-24e are provided at the other side (right side in FIG. 1) of the lower LCD 12. The direction input button 24a and the buttons 24b-24e are utilized for performing various operations to the game apparatus 10.

FIG. 3(A) is a left side view of the game apparatus 10 in the close state, FIG. 3(B) is a front view of the game apparatus 10, FIG. 3(C) is a right side view of the game apparatus 10, and FIG. 3(D) is a rear view of the game apparatus 10. As shown in FIG. 3(C) and FIG. 3(A), the volume button 24i is provided on the left side surface of the lower housing 20. The volume button 24i is utilized for adjusting a volume of a speaker 34 furnished in the game apparatus 10. Furthermore, as shown in FIG. 3(D), the button 24h is provided at the right corner of the upper side surface of the lower housing 20. The button 24g is provided at the left corner of the upper side surface of the lower housing 20. The both of the buttons 24g and 24h are utilized for performing a imaging instructing operation (shutter operation) on the game apparatus 10, for example. Alternatively, both of the buttons 24g and 24h may be made to work as shutter buttons. In this case, a right-handed user can use the button 24h, and a left-handed user can use the button 24g, capable of improving usability for both of the users. Additionally, the game apparatus 10 can constantly make both of the buttons 24g and 24h valid as shutter buttons, or the game apparatus 10 is set to be a right-handed use or a left-handed use (the setting is input by the user according to a menu program, etc. and the set data is stored), and when the right-handed use is set, only the button 24h is made valid, and when the left-handed use is set, only the button 24g may be made valid.

As shown in. FIG. 1, the game apparatus 10 is further provided with the touch panel 28 as an input device other than the respective operation buttons 24a-24i. The touch panel 28 is set to the screen of the lower LCD 12. In this embodiment, the touch panel 28 is a touch panel of a resistance film system. Here, the touch panel can employ arbitrary push type touch panels over the resistance film system. In this embodiment, as the touch panel 28, a touch panel having the same resolution (detection accuracy) as that of the lower LCD 12 is utilized. The resolution of the touch panel 28 and the resolution of the lower LCD 12 are not necessarily coincident with each other. Furthermore, at the right side surface of the lower housing 20, an inserting portion 30 (shown by a dotted line in FIG. 1 and FIG. 3(D)) is provided. The inserting portion 30 can house a touch pen 36 utilized for performing an operation on the touch panel 28. It should be noted that an input to the touch panel 28 is generally performed by means of the touch pen 36, but can be performed on the touch panel 28 with fingers of the user besides the touch pen 36.

It should be noted that on the right side surface of the lower housing 20, an openable and closeable cover portion (not illustrated) is provided. Inside the cover portion 11B, a connector (not illustrated) for electrically connecting the game apparatus 10 and the memory card 38 is provided. The memory card 38 is detachably attached to a connector. The memory card 38 is used for storing (saving) image data imaged by the game apparatus 10, for example.

As shown in FIG. 1, at the left of the shaft portion 20a of the lower housing 20, three LEDs 26a-26c are attached. Here, the game apparatus 10 can perform a wireless communication with another appliance, and the first LED 26a lights up when a wireless communication with the appliance is established. The second LED 26b lights up while the game apparatus 10 is recharged. The third LED 26c lights up when the main power supply of the game apparatus 10 is turned on. Accordingly, by the three LEDs 26a-26c, it is possible to inform the user of a communication-established state, a charge state, and a main power supply on/off state of the game apparatus 10.

Figure 4:
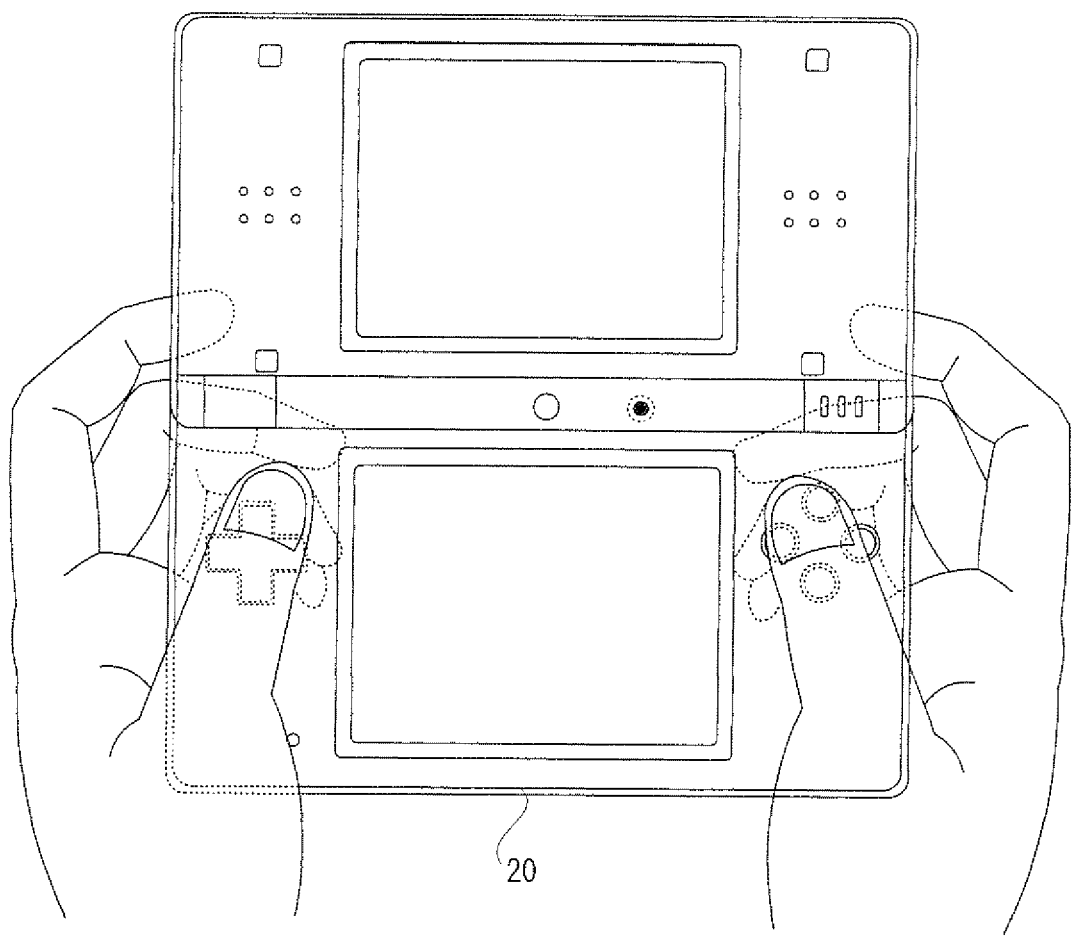
FIG. 4 is an illustrative view showing a situation in which the game apparatus is held by the user.

As described above, the lower housing 20 is provided with the input device (touch panel 28 and respective buttons 24a-24i) for performing an operation input to the game apparatus 10. Accordingly, when utilizing the game apparatus 10, the user can perform an operation on the game apparatus 10 by holding the lower housing 20. FIG. 4 is an illustrative view showing a situation in which the user holds the game apparatus 10 with both of the hands. As shown in FIG. 4, the user holds the side surface and the outer surface (surface opposed to the inner surface) of the lower housing 20 with the palm and the middle fingers, the ring finger and the little finger of both of the hands in a state the respective LCD 12 and 14 are turned to the user. By thus holding the game apparatus, the user performs operations on the respective buttons 24a-24e with the thumb and operations on the buttons 24g and 24h with the index finger while holding the lower housing 20.

On the one hand, the upper housing 22 has a configuration for imaging an image (camera), and a configuration for displaying the imaged image (display). The configuration of the upper housing 22 is explained below.

As shown in FIG. 1, the game apparatus 10 has the upper LCD 14. The upper LCD 14 is set to the upper housing 22. The upper LCD 14 takes a horizontally-long shape, and is arranged such that the direction of the long side is coincident with the long side of the upper housing 22. The upper LCD 14 is provided on the inner surface of the upper housing 2 (the inner surface when the game apparatus 10 is in the close state). Accordingly, if the game apparatus 10 is not to be used, the game apparatus 10 is set to the close state to thereby prevent the screen of the upper LCD 14 from being soiled, damaged, and so forth. Here, similar to the lower LCD 12, in place of the upper LCD 14, a display with an arbitrary form and an arbitrary resolution may be utilized. It should be noted that in another embodiment, a touch panel may be provided on the upper LCD 14 as well.

Furthermore, the game apparatus 10 has the two cameras 16 and 18. The respective cameras 16 and 18 are housed in the upper housing 22. As shown in FIG. 1, the inward camera 16 is attached to the inner surface of the upper housing 22. On the other hand, as shown in FIG. 3(B), the outward camera 18 is attached to the surface being opposed to the surface to which the inward camera 16 is provided, that is, the outer surface of the upper housing 22 (outer surface when the game apparatus 10 is in the close state). Thus, the inward camera 16 can image a direction to which the inner surface of the upper housing 22 is turned, and the outward camera 18 can image a direction opposite to the imaging direction of the inward camera 16, that is, a direction to which the outer surface of the upper housing 22 is turned. As described above, in this embodiment, the two cameras 16 and 18 are provided so as to make the imaging directions opposite to each other. Accordingly, the user can image the two different directions without shifting the game apparatus 10 inside out. For example, the user can image a landscape as the user is seen from the game apparatus 10 with the inward camera 16, and can image a landscape as the direction opposite to the user is seen from the game apparatus 10 with the outward camera 18.

Furthermore, the inward camera 16 is attached to the center of the shaft portion 22a formed at the bottom of the upper housing 22. That is, the inward camera 16 is attached at the center part where the two housings 20 and 22 are connected. Accordingly, in a case that the game apparatus 10 is in the open state, the inward camera 16 is arranged between the two LCDs 12 and 14 (see FIG. 1). In other words, the inward camera 16 is positioned in the vicinity of the center of the game apparatus 10. Here, "the center of the game apparatus 10" means the center of the operation surface of the game apparatus 10 (surface being made up of the inner surfaces of the respective housings 20 and 22 in the open state). Here, it may be said that the inward camera 16 is arranged in the vicinity of the center in the horizontal direction of the LCDs 12 and 14.

In this embodiment, when the game apparatus 10 is set to the open state, the inward camera 16 is arranged in the vicinity of the center of the game apparatus 10, and therefore, in a case that the user images the user himself or herself by the inward camera 16, the user may hold the game apparatus 10 at a position directly opposite to the game apparatus 10. That is, if the user holds the game apparatus at a normal holding position, the user is positioned at approximately the center of an imaging range, and the user himself or herself can easily be within the imaging range.

Furthermore, as shown in FIG. 3(B), the outward camera 18 is arranged at the upper end of the upper housing 22 (portion far away from the lower housing 20) in a case that the game apparatus 10 is set to the open state. Here, since the outward camera 18 is not for imaging the user holding the game apparatus 10, there is less need for being provided at the center of the game apparatus 10.

Additionally, as shown in FIG. 1 or FIG. 3(B), a microphone 32 is housed in the upper housing 22. More specifically, the microphone 32 is attached to the shaft portion 22a of the upper housing 22. In this embodiment, the microphone 32 is attached around the inward camera 16 (next to the inward camera 16 along the y axis), and specifically attached next to the inward camera 16 in the positive direction of the y axis. Furthermore, a through hole for microphone 22c is mounted to the shaft portion 22a at a position corresponding to the microphone 32 (next to the inward camera 16) such that the microphone 32 can detect a sound outside the game apparatus 10.

Additionally, the microphone 32 may be housed in the lower housing 20. For example, the through hole 22c for microphone is provided to the inner surface of the lower housing 20, specifically, at the lower left of the inner surface of the lower housing 20 (button arranging area A1), and the microphone 32 can be placed in the vicinity of the through hole 22c for microphone within the lower housing 20. Furthermore, the microphone 32 is attached such that the sound collecting direction (in a such a direction that the sensitive becomes maximum) becomes a direction approximately in parallel with the imaging direction (optical axis) of the inward camera 16 (in other words, the sound collecting direction and the imaging direction are approximately parallel with y-axis). Thus, a voice generated within the imaging range of the inward camera 16 can be captured by the microphone 32 suitably. That is, it is possible to perform detection of an input of the microphone 32 and detection of the user at the same time, and improve detection accuracy.

As shown in FIG. 3(B), on the outer surface of the upper housing 22, a fourth LED 26d is attached. The fourth LED 26d is attached around the outward camera 18 (at the right side of the outward camera 18 in this embodiment). The fourth LED 26d lights up at a time when an imaging is made with the inward camera 16 or the outward camera 18 (shutter button is pressed). Furthermore, the fourth LED 38 continues to light up while a motion image is imaged by the inward camera 16 or the outward camera 18. By making the fourth LED 26d light up, it is possible to inform an object to be imaged that an imaging with the game apparatus 10 is made (is being made).

In addition, the inner surface of the lower housing 22 is formed to be approximately planar. As shown in FIG. 1, at the center of the inner surface, an opening 22b for exposing the upper LCD 14 is formed. The screen of the upper LCD 14 housed inside the upper housing 22 is exposed from the opening 22b. Furthermore, on both side of the aforementioned opening 22b, a sound release hole 22d is formed one by one. Inside the sound release hole 22d of the upper housing 22, a speaker 34 is housed. The sound release hole 22d is a through hole for releasing a sound from the speaker 34.

Thus, on the inner surface of the upper housing 22, non-display areas (areas B1 and B2 represented by a dotted lines in FIG. 1. More specifically, areas for arranging the speaker 34; speaker arranging areas) are provided on both sides of the opening 22b set at the center of the upper LCD 14. The two sound release holes 22d are arranged at approximately the center of the horizontal direction of each speaker arranging area with respect to the horizontal direction, and at the lower portion of each speaker arranging area with respect to the vertical direction (area close to the lower housing 20).

It should be noted that as described above, the non-display areas are provided at the same positions of the lower housing 20 and the upper housing 22 in the right and left direction, and whereby, the game apparatus 10 can be readily held in a case that it is vertically held (a state that the game apparatus 10 is rotate to the left or the right by 90 degrees from the state shown in FIG. 4) as well as in a case that it is horizontally held as shown in FIG. 4.

As described above, the upper housing 22 is provided with the cameras 16 and 18 which are configured to image an image and the upper LCD 14 as a display means for mainly displaying the imaged image. On the other hand, the lower housing 20 is provided with the input device (touch panel 28 and respective buttons 24a-24i) for performing an operation input to the game apparatus 10. Accordingly, when utilizing the game apparatus 10 as an imaging device, the user can perform an input to the input device with the lower housing 20 holding while viewing the imaged image (image imaged by the camera) displayed on the upper LCD 14.

Furthermore, in the vicinity of the camera 16 of the upper housing 22, the microphone 32 configured to input a sound is provided, and the game apparatus 10 can also be used as a recording device. In addition, the user performs a sound input through the microphone 32, and the game apparatus 10 can execute game processing and application processing except for the game on the basis of the microphone input information.

Figure 5:
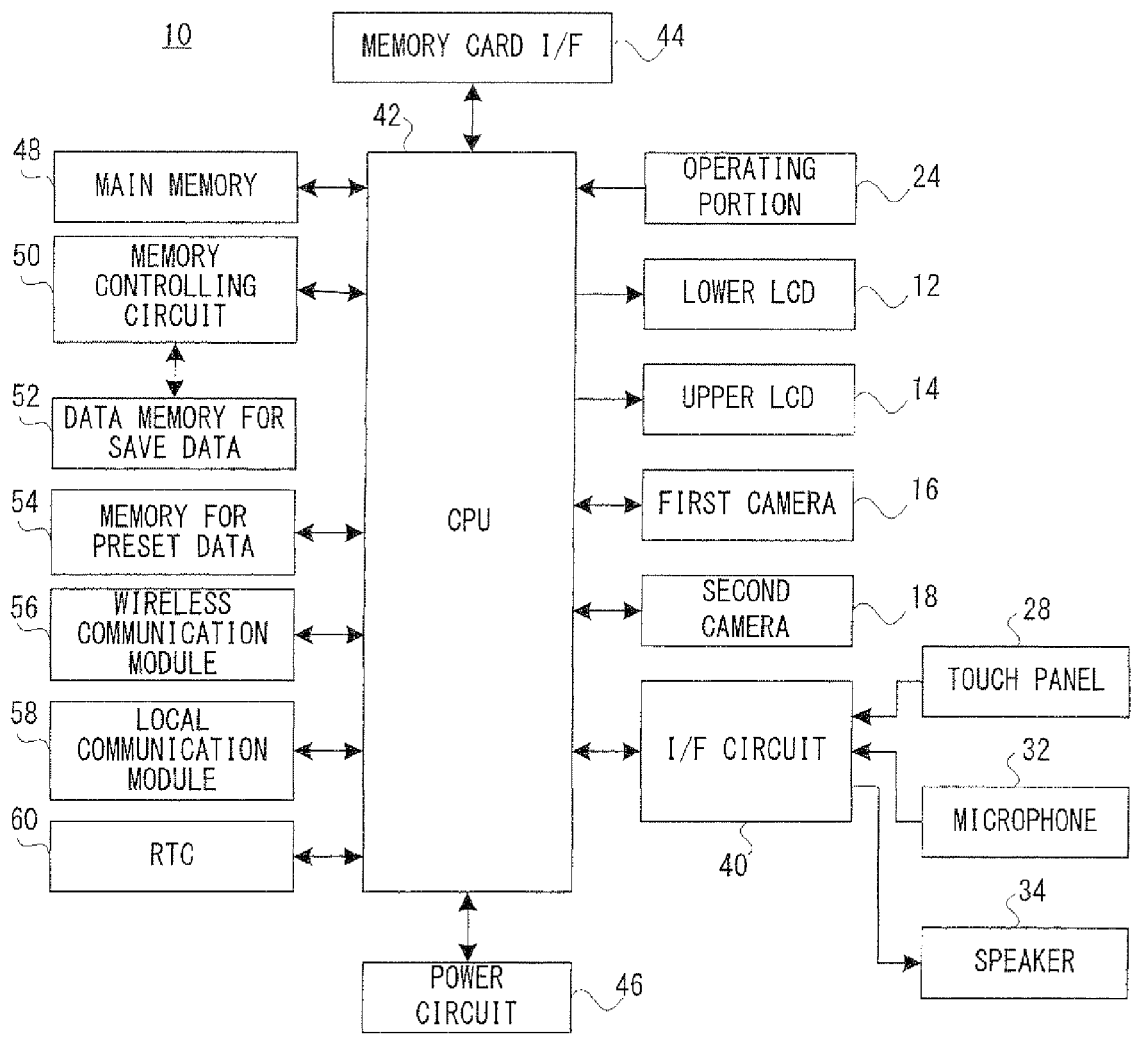
FIG. 5 is a block diagram showing one example of an electric configuration of the game apparatus.

FIG. 5 is a block diagram showing an internal configuration (electric configuration) of the game apparatus 10. As shown in FIG. 5, the game apparatus 10 includes electronic components, such as a CPU 42, a main memory 48, a memory controlling circuit 50, a memory for saved data 52, a memory for preset data 54, a memory card interface (memory card I/F) 44, a wireless communication module 56, a local communication module 58, a real-time clock (RTC) 39, a power supply circuit 46, and an interface circuit (I/F circuit) 40, etc. Theses electronic components are mounted on an electronic circuit board, and housed in the lower housing 20 (or the upper housing 22 may also be appropriate).

The CPU 42 is an information processing means to execute various programs. In a case that the game apparatus 10 is utilized as an imaging device, the program for it is stored in the memory (memory for saved data 52, for example) within the game apparatus 10. The CPU 42 executes the program to allow the game apparatus 10 to function as an imaging device. Here, the programs to be executed by the CPU 42 may previously be stored in the memory within the game apparatus 10, may be acquired from the memory card 38, and may be acquired from another appliance by communicating with this another appliance or downloaded from the server via the Internet.

The CPU 42 is connected with the main memory 48, the memory controlling circuit 50, and the memory for preset data 54. Furthermore, the memory controlling circuit 50 is connected with the memory for saved data 52. The main memory 48 is a memory means to be utilized as a work area and a buffer area of the CPU 42. That is, the main memory 48 stores various data to be utilized in the game processing and the imaging processing, and stores a program obtained from the outside (memory cards 38, another appliance, etc.). In this embodiment, a PSRAM (Pseudo-SRAM) is used, for example, as a main memory 48. The memory for saved data 52 is a memory means for storing a program to be executed by the CPU 42, data of an image imaged by the respective cameras 16 and 18, save data of a game and an application, etc. The memory for saved data 52 is configured by a NAND-type flash memory, for example (NOR-type flash memory and non-volatile memory may be available). The memory controlling circuit 50 is a circuit for controlling reading and writing from and to the memory for saved data 52 according to an instruction from the CPU 42. The memory for preset data 54 is a memory means for storing data (preset data), such as various parameters, etc. which are previously set in the game apparatus 10. As a memory for preset data 54, a flash memory to be connected to the CPU 42 through an SPI (Serial Peripheral Interface) bus can be used.

The memory card I/F 44 is connected to the CPU 42. The memory card I/F 44 performs reading and writing data from and to the memory card 38 attached to the connector according to an instruction from the CPU 42. In this embodiment, the image data imaged by the respective cameras 16 and 18 is written to the memory card 38, and the image data stored in the memory card 38 is read from the memory card 38 and stored in the memory for saved data 52.

The wireless communication module 56 has a function of connecting to a wireless LAN according to an IEEE802.11.b/g standard-based system, for example. Furthermore, the local communication module 58 has a function of performing a wireless communication with the same types of the game apparatuses by a predetermined communication system. The wireless communication module 56 and local communication module 58 are connected to the CPU 42. The CPU 42 can send and receive data over the Internet with other appliances by means of the wireless communication module 56, download a program from a server (not shown) and can send and receive data with the same types of other game apparatuses by means of the local communication module 58.

Additionally, the CPU 42 is connected with the RTC 60 and the power supply circuit 46. The RTC 60 counts a time to output the same to the CPU 42. The CPU 42 can calculate a current time (date) on the basis of the time counted by the RTC 60, and detects an various processing execution timing. The power supply circuit 46 controls power supplied from the power supply (a battery accommodated in the lower housing) included in the game apparatus 10, and supplies the power to the respective circuit components within the game apparatus 10.

Moreover, the game apparatus 10 is provided with the microphone 32 and the speaker 34. The microphone 32 and the speaker 34 are connected to the I/F circuit 40. The microphone 32 detects a sound of the user and outputs a sound signal to the I/F circuit 40. The speaker 34 outputs a sound corresponding to the sound signal from the I/F circuit 40. The I/F circuit 40 is connected to the CPU 42. Furthermore, the touch panel 28 is connected to the I/F circuit 40. The I/F circuit 40 includes a sound controlling circuit for controlling the microphone 32 and the speaker 34, and a touch panel controlling circuit for controlling the touch panel 28. The sound controlling circuit performs an A/D conversion and a D/A conversion on a sound signal, or converts a sound signal into audio data in a predetermined format. The converted audio data is written to a sound area (not shown) of the main memory 48. If the game apparatus 10 is utilized as a recording device, the audio data stored in the sound area is written to the memory for saved data 52 via the memory controlling circuit 50 thereafter (recorded in the memory card 38 via the memory card I/F 44 as required). The touch panel controlling circuit generates touch position data in a predetermined format on the basis of a signal from the touch panel 28 and outputs the same to the CPU 42. The touch position data indicates coordinates of a position where an input is performed on an input surface of the touch panel 28. Also, the touch panel controlling circuit performs reading of a signal from the touch panel 28 and generation of the touch position data per each predetermined time. The CPU 42 can know the position where an input is made on the touch panel 28 by acquiring the touch position data.

The operating portion 24 is made up of the aforementioned respective buttons 24a-24i, and connected to the CPU 42. The operation data indicating an input state (whether or not to be pressed) with respect to each of the operation buttons 24a-24k is output from the operation button 24 to the CPU 42. The CPU 42 executes processing according to an input to the operating portion 24 by acquiring the operation data from the operating portion 24.

The respective cameras 16 and 18 are connected to the CPU 42. The respective cameras 16 and 18 image images according to an instruction from the CPU 42, and output the imaged image data to the CPU 42. The CPU 42 writes the image data from each of the cameras 16 and 18 to an image area (not shown) of the main memory 48. In a case that the game apparatus 10 is utilized as an imaging device, the image data stored in the image area is written to the memory for saved data 52 via the memory controlling circuit 50 (and moreover recorded in the memory card 38 via the memory card I/F 44 as required). Furthermore, the image data sorted in the image area can also be utilized for various game processing.

In addition, each of the LCDs 12 and 14 is connected to the CPU 42. Each of the LCDs 12 and 14 displays an image according to an instruction by the CPU 42. In a case that a game is played in the game apparatus 10, a game image is displayed on any one of the LCDs 12 and 14 or both of them. In a case that the game apparatus 10 is utilized as an imaging device, the CPU 42 displays an image acquired from any one of the cameras 16 and 18 on the upper LCD 14, and displays an operation screen generated according to predetermined processing on the lower LCD 12.

When facial training is performed in the game apparatus 10 configured as described above, a screen shown in each of FIG. 6(A)-FIG. 6(D) is displayed on the upper LCD 14 (hereinafter referred to as "LCD 14"). It should be noted that the screen may be displayed on the lower LCD 12, or may be displayed to cover both of the LCDs. Furthermore, the configuration of the screen is merely a simplified example, and can be changed to various ways.

First, the outline of the facial training is explained with reference to FIG. 6(A)-FIG. 6(D). When performing a facial training, the user connects the game apparatus 10 to a network (not illustrated), and downloads a desired application from the server (not illustrated) via the network.

Here, there are a series of applications for facial training, such as an "application A", an "application B", an "application C", . . . , for example, and the application A includes training 0 and 1, the application B includes the training 0 and a training 2, and the application C includes the training 0 and a training 3. The trainings 0, 1, 2 and 3 are trainings for training an entire, a part, another part and still another part of the face, respectively, for example.

In this embodiment, programs Pa-Pc corresponding to the three applications A-C and their attendant various tables CT, RT and MT are received through the wireless communication module 56 by the CPU 42, and stored in the memory for saved data 52 (see FIG. 7(A): details are described later).

The applications A-C were executed by the game apparatus 10 in the past, and thus the memory for saved data 52 further stores save data Da-Dc respectively corresponding to the applications A-C. Here, the save data Da-Dc can also be said to be data indicating parameter in relation to each of the applications A-C changed by execution of each of the applications A-C. With respect to the application to be executed first, the save data corresponding thereto is newly generated in the memory for saved data 52. That is, the save data is saved for each application, but all save data for application have common structure (see FIG. 8: details are explained later).

The save data Da includes save items for applications B, C and save item data which does not specify an application as well as an save item for application A and this holds true for the save data Db, Dc (see FIG. 9: details is explained later). That is, there is save data being common to the applications A-C, and the save data being stored as three save data for applications A-C is the save data Da-Dc. Accordingly, the save data Da-Dc essentially has to have identical contents, but causes a difference depending on an executed situation of each application A-C. Thereupon, a routine in order to cancel the difference is incorporated in the programs Pa-Pc.

It should be noted that a part or all of the programs Pa-Pc and tables CT, RT and MT may be read from the memory card 38, etc. through the memory card I/F or stored in advance in the memory for saved data 52 in stead of being downloaded from the server.

After completion of downloading, the CPU 42 displays an application selection screen as shown in FIG. 6(A) on the LCD 14. The application selection screen includes three buttons "A", "B" and "C" respectively corresponding to the applications A-C, a text prompting the user to select any one of them, "SELECT APPLICATION", a button for instructing the user to activate the selected application, "ACTIVATE", and a button for instructing the user to display an selected application introduction screen (not illustrated), "SEE INTRUDUCTION".

When the application A is selected on the application selection screen shown in FIG. 6(A), and the "ACTIVATE" is instructed, the CPU 42 displays a facial training selection screen as shown in FIG. 6(B) on the LCD 14. The facial training selection screen includes two buttons "0" and "1" corresponding to two kinds of training and a text for prompting the user to select any one of them, "SELECT TRAINING".

When the training 0 is selected on the facial training selection screen shown in FIG. 6(B), the CPU 42 displays a training screen as shown in FIG. 6(C) on the LCD 14. The training screen includes a text for explaining the content of the training "0", that is, "TRAININ FACIAL MUSCLES OF EXPRESSION OF ENTIRE FACE", a check box CB, and a text for prompting the user to check the check box CB after performing the training", that is, "CHECK BOX AFTER TRAININTG". Although illustration is omitted, on the training screen, an image representing a model and a text indicating a commentary and so on are displayed as necessary, and the user can practice training with reference to the model and the commentary within the screen.

When on the training screen shown in FIG. 6(C), the check box CB is checked, and an instruction of performing evaluation of the training result (facial expression measurement) is made, the CPU 42 displays an evaluation screen on the LCD 14 as shown in FIG. 6(D). The evaluation screen includes a text for informing the user of performing the facial expression measurement, that is, "MEASURE FACIAL EXPRESSION . . . ", and a text indicating the evaluation result, that is, "TODAY'S SCORE IS 80 POINTS". Here, the evaluation result, that is, the score is a numerical value indicating how faithfully the user can moves the muscles of the face to the model, and is calculated according to a predetermined algorithm. More specifically, an image of the face of the user is imaged by the first camera 16, and a movement of each muscle (palpebral muscle, buccinator muscle, etc.) is analyzed from the facial image, and the analysis result is compared with the model (data indicating ideal movement of each muscle, and downloaded together with the program), to thereby represent similarities with the model on a one-hundred-point basis, for example.

During execution of the facial training as described above, each of the save data Da-Dc is sequentially updated by the CPU 42. Irrespective of the applications A-C which is being executed, each of the save data Da-Dc is updated. More specifically, the CPU 42 integrates the save data Da-Dc prior to starting the training for each item (see FIG. 9). Here, the integration means that one data is adopted out of the data in a head item of the respective save data Da-Dc, the adopted data is regarded as data in the head item, and this processing is repeated until the last item to thereby obtain integrated save data Dint. When the training is then started, each time that a motion being relevant to any item is performed, the integrated save data Dint is updated while each of the save data Da-Dc is overwritten with the updated integrated save data Dint in response to an automatic saving instruction or a saving instruction by the user. The overwriting is performed by a file unit (see FIG. 8). Here, overwriting the save data Da-Dc with the updated integrated save data Dint may be said to update each of the save data Da-Dc with the updated integrated save data Dint, and to rewrite the save data Da-Dc as the updated integrated save data Dint. The series of processing is explained in detail below.

Referring to FIG. 7(A), the memory for saved data 52 includes a program area 70 and a data area 72, and the program area 70 stores programs Pa-Pc respectively corresponding to the applications A-C, and the data area 72 stores the save data Da-Dc for the applications A-C. The data area 72 further stores various tables to be utilized in the update processing, specifically, an item table CT, an integration rule table RT, and a file management table MT. Referring to FIG. 7(B), the main memory 48 includes a data area 74, and the data area 74 stores the save data Dint for integration.

Referring to FIG. 8, the save data Da-Dc for applications A-C and the save data Dint for integration each includes save data of 41 kinds of items 1-41. The items 1-41 are classified into 19 groups according to the contents, and one file is assigned to each group.

The contents of the items 1-41 are shown in FIG. 9, and the items 1-3 are as to whether or not the introduction of the applications A-C is seen, and assigned a file 1, for example. The items 4-7 are as to whether or not the trainings 0-3 are performed even once, and are assigned a file 2. The items 8-10 are as to whether or not the check mark for training by the applications A-C on a first day (check mark: see FIG. 6(C)) is checked, and are assigned a file 3. The items 11-13 are as to whether or not the check mark for training by the applications A-C on the first day, and are assigned a file 4. The items 14-16, 17-19, 20-22, 23-25, 26-28 and 29-31 correspond to a third-a seventh days, and are assigned files 5-9, respectively. The items 32-38 respectively correspond to the score on the first-seventh days, and are assigned files 10-16. The item 39 is as to photograph managing information, and is assigned a file 17. The item 40 is as to whether or not "the last training date is today", and is assigned a file 18. Then, the item 41 is as to a date and time at the last warm-up, and is assigned a file 19.

Furthermore, to a part of the 19 files, the files 18 and 19, here, data indicating updated date and time of each file is added. To the rest of the files 1-17, the updated-date-and-time data is not added (or invalid data, such as 0000 year . . . is added).

Referring to FIG. 9, in the item table CT, a substance of the items, an application which refers to the item (reference application), and an application which updates the item (updating application) are described as to each item in addition to the above-described content. For example, the content of the item 1 is "whether or not the introduction of the applications A-C is seen", so that the substance is a flag indicating YES or NO. Then, an application which refers to the flag is only the application A, and an application which updates the flag is restricted to only the application A when "the introduction of the application A is seen". As to each of the items 2, 3, the substance is a flag, and the reference application and the updating application are restricted to the applications B, C, itself. These flags are flags in relation to proceedings of the application, and are for determining whether or not the predetermined processing is performed in correspondence with the proceedings of the application.

As to the item 4, the content is "whether or not the trainings 0 (entire face) is performed even once", so that the substance is a flag. The flag is referred by all the applications A-C and updated by all the applications A-C. As to the item 5, the content is "whether or not the training 1 (a part of the face, for example) is performed even once, so that the substance is a flag. The reference application and the updating application are restricted to the application A itself. As to each of the items 6, 7, the substance is flags, and the reference application and the updating application are restricted to B or C itself.

As to the item 8, the content is as to whether or not "the training is executed by the application A on the first day, so that the substance is a flag. The flag is referred by all the applications A-C, but the application which updates the flag in a case that "the training is executed by the application A on the first day is restricted to the application A itself. As to the item 9, the content is as to whether or not "the training is executed by the application B on the first day, so that the substance is a flag, and the reference application is all the applications A-C, but the updating application is restricted to the application B itself. As to the item 10, the content is as to whether or not "the training is executed by the application C on the first day, so that the substance is a flag, so that the reference application are all the applications A-C, but the updating application is restricted to the application C itself. The same thing as the items 8-10 and the items 11-13 can be applied to the items 14-16, 17-19, 20-22, 23-25, 26-28 and 29-31.

As to the item 32, the content is "the score on the first day", so that the substance is a score. The score is referred by all the applications A-C, and is updated by all the applications A-C. This holds true for the items 33-38.

As to the item 39, the content is "photograph managing information", so that the substance is a date and time of imaging, a number (title), a data amount. The photograph managing information is referred by all the applications A-C, and are updated by all the applications A-C. As to the item 40, the content is "whether or not the last training day is today", so that the substance is a flag. The flag is referred by all the applications A-C, and are updated by all the applications A-C. Then, as to the item 41, the content is "the date and time at the last warm-up", so that the substance is a date and time. The date and time is referred by all the applications A-C, and is updated by all the applications A-C.

Additionally, in the item table CT shown in FIG. 9, an integration rule (any one of the rules R1-R5 to be explained next) to be applied to each item is described in advance.

Referring to FIG. 10, in the integration rule table RT, 5 kinds of integration rules R1-R5 are described depending on an attribute of the file assigned to the item and the substance of the item. More specifically, as an attribute of a file, two kinds of attributes, such as "the updated-date-and-time data is included" and "the updated-date-and-time data is not included" are described, and then, as a substance corresponding to the item, "the updated-date-and-time data is included", two kinds of substances, such as a "flag" and a "thing other than flag" are described, and as a substance of the item corresponding to the "the updated-date-and-time data is not included", a "flag", a "score" and "photograph managing information" are described.

Then, as an integration rule R1 of the item for which the file attribute is "the updated-date-and-time data is included" and the substance of the item is the "flag", "the newest data is adopted, however, if there is data with a date the same as that of the newest data, the flag set as to the same date is set" is described. Furthermore, as an integration rule R2 of the item for which the file attribute is "the updated-date-and-time data is included" and the substance of the item is "the thing except for the flag", "the newest data is adopted" is described. As an integration rule R3 of the item for which the file attribute is "the updated-date-and-time data is not included" and the substance of the item is "the flag", "if any flag is set, the flag is set" is described. As an integration rule R4 of the item for which the file attribute is "the updated-date-and-time data is not included" and the substance of the item is "the score", "if there is different scores on the same date, the best score is adopted" is described. As an integration rule R5 of the item for which the file attribute is "the updated-date-and-time data is not included" and the substance of the item is "the photograph managing information", "the photograph is adopted according to OR, that is, logical sum, however, if there is different photographs with the same management information, neither photograph is adopted (the photograph is read to recreate the photograph managing information)" is described.

Each of the save data Da-Dc is integrated every item on the basis of such the integration rule table RT. More specifically, referring to FIG. 8-FIG. 10, with respect to the items 1-3, the file 1 as the assigned file is that "the file updated-date-and-time data is not included, and the substance is the flag, so that the rule R3 is applied. With respect to the items 4-7, the file 2 as the assigned file is that "the file updated-date-and-time data is not included, and the substance is the flag, so that the rule R3 is applied. With respect to the items 8-10, the file 3 as the assigned file is that "the file updated-date-and-time data is not included, and the substance is the flag, so that the rule R3 is applied. Each of the items 11-43, 14-16, 17-19, 20-22, 23-25, 26-28 and 29-31 is assigned the rule R3 similar to the items 8-10.

With respect to the item 32, the assigned file 10 is that the updated-date-and-time data is not included, and the substance is the score, so that the rule R4 is applied. Each of the items 33-38 is also assigned the rule R4 similar to the item 32. With respect to the item 39, the assigned file 17 is that the updated-date-and-time data is not included, and the substance is the photograph managing information, so that, the rule R5 is applied. With respect to the item 40, the assigned file 18 is that the file updated-date-and-time data is included, and the substance is the flag, so that, the rule R1 is applied. Then, with respect to the item 41, the assigned file 19 is that the file updated-date-and-time data is included, and the substance is the date and time, that is, the thing other than the flag, so that the rule R2 is applied.

FIG. 11 shows one example of an integration for every item. First, with respect to the item 1, when as to the save data Da, the flag is set (flag:ON), as to each of the save data Db, Dc, and neither flag is set on (flag :OFF), the rule R3 is applied, so that as to the integrated save data Dint, the flag is set (flag :ON). Furthermore, with respect to the item 2, when as to each of the save data Da-Dc, the flag is not set (flag: OFF), the rule R3 is applied, so that as to the integrated save data Dint, the flag is not set (flag:OFF). Each of the respective items 3-31 is integrated similar to the above description.

Next, with respect to the item 32, when the save data Da, Db, Dc whose scores are 80, 75, 85, respectively, the rule R4 is applied, so that as to the integrated save data Dint, the score becomes 85. Each of the items 33-38 is integrated similar to the above description.

Next, with respect to the item 39, if the save data Da, Db, Dc whose photograph managing information (imaging number) are respectively #1-#12, #2-#13, #1-#13, the logical sum, that is, the imaging number #1-#13 are adopted following the rule R5. It should be noted that according to the postscript that if there are different photographs with the same imaging information, neither imaging information is adopted, if one sheet of photograph out of three sheets of photographs identified with the imaging number #2, is different from the other two, the imaging number #2 is not adopted. In this case, the three sheets of photographs corresponding to the imaging number#2 are read to be confirmed, and the imaging number is attached again.

Next, with respect to the item 40, when as to the save data Da, the flag is not set (flag :OFF) (the file updated date and time :2009_8_1_15:00) is adopted, as to the save data Db, the flag is set (flag :ON) (the file updated date and time :2009_8_15_11:00), and as to the save data Dc, the flag is not set (flag :OFF) (the file updated date and time :2009_8_20_12:00), the rule R1 is applied, so that as to the integrated save data Dint, the flag is not set (flag OFF) (the file updated date and time :2009_8_20_12:00). Here, if the file updated date and time of the save data Db is not 2009_8_15_11:00 but 2009_8_20_11:00, this is the same date as the newest data, and the flag is turned on in the same date data, as to the integrated save data Dint, the flag:ON of the same date data is adopted.

Next, with respect to the item 41, when as to the save data Da, the date and time is 2009_8_1_16:00, and as to the save data Db, there is no data, and as to the save data Dc, the date and time is 2009_8_20_11:00, the rule R2 is applied, so that as to the integrated save data Dint, the date and time becomes 2009_8_20_11:00.

The save data Da-Dc is overwritten with the integrated save data Dint thus obtained. The overwriting is performed in a file unit every time that any item is updated.

Furthermore, in the game apparatus 10, prior to the aforementioned integrating processing, file controlling processing is executed as follows. Referring to FIG. 12(A), in the file management table MT before control (12:00 p.m. Aug. 20, 2009 as of current date), as to each of the save data Da-Dc when it is read, the sate and the updated date and time of each of the files 1-19 are described. As a state, there are three kinds, such as "normal" indicating that the file is normal (can be opened), "corruption" indicating that the file is corrupted (cannot be opened), and "Null" indicating that there is no file (invalid). Which kind the state of each file is determined by searching and opening a file or by referring a file system not shown.

Furthermore, in the updated date and time, in a case of a file including the updated-date-and-time data, the value read from the file (2009_8_1_15:00, for example) is described, and in a case of a file not including the updated-date-and-time data, no data is described (or invalid value, 0000 year 0 month 0 date 0:00, for example is described).

Referring to FIG. 12(B), the file management table MT after control (12:00 p.m. Aug. 20, 2009 as of current date) is obtained by making two changes in each of the state and the updated date and time in the above-described file management table MT before control. More specifically, as to the state, the state of the file 2 of the save data Db is changed from the "corruption" to the "null" without erasing the file, and the state of the file 3 of the save data Da is changed from the "corruption" to the "null" after erasing the file.

Here, whether or not the "corruption" file is erased is decided depending on whether or not there is the same "normal" file in another save data. The file 2 corrupted in the save data Db is not erased because there is the same normal file 2 in the save data Da or Dc. The file 3 corrupted in the save data Dc is erased because the same normal file 3 is not present in each of the save data Da and Db. The "null" file 2 which is not erased here is overwritten with the "normal" file 2 in the integrating processing and the overwriting processing after it.

As to the updated date and time, a file which is the future with respect to the current date and time is an object to be controlled. There are two kinds of controlling, such as changing the updated time to the current time with the save data included in the file valid, and invalidating the entire save data included in the file, and which control is performed is dependent on whether the updated date and time is the same as the current date and time or the next day onward.

More specifically, as to the file 18 of the save data Dc, the updated date and time is "2009_8_20_13:00", and this is the future and the same date as the current date and time "2009_8_20_12:05", so that this is changed to the current date and time with the save data included in the file 18 valid. On the other hand, as to the file 19 of the save data Db, the updated date and time is "2009_8_21_11:00", and this is the future and the next day onward with respect to the current date and time "2009_8_20_12:00", so that the save data included in the file 19 is entirely made invalid.

By performing such the file controlling processing in advance, even if there is corrupted data (abnormality occurs to the data within the file), if there is the same normal file (if there is the same and normal data within another file), the corrupted file (abnormal data) can be repaired by the normal file (normal data) through the integrating processing and the overwriting processing thereafter. In addition, in the game apparatus 10, adjustment of the RTC 60 is possible, and therefore, when the current date and time based on the RTC 60 is adjusted in a direction extending to the past, the file updated date and time becomes the future with respect to the current date and time and difficulties occur to the integrating processing, but if the file updated date and time indicating the future is the date same as the current date and time, this is updated to the current date and time, so that it is possible to reduce probability of occurrence of difficulties to the integrating processing.

Next, an operation of the CPU 42 when the facial training is performed is explained according to flowcharts in FIG. 13-FIG. 18. These flowcharts correspond to the program Pa for application A shown in. FIG. 7. Here, the programs Pb, Pc for the application B, C are described according to the flowcharts in FIG. 13-FIG. 18, and therefore, the explanation is omitted.

At this time, downloading the program, etc. has already been finished, and the programs Pa-Pc for applications A-C are stored in the program area 70 of the memory for saved data 52, and the item table CT, the integration rule table RT and the file management table MT are stored in the data area 72. Furthermore, each of the applications A-C could be executed in the past, and save data for applications A-C is also stored in the data area 72 (see FIG. 7(A)).

Figure 13:
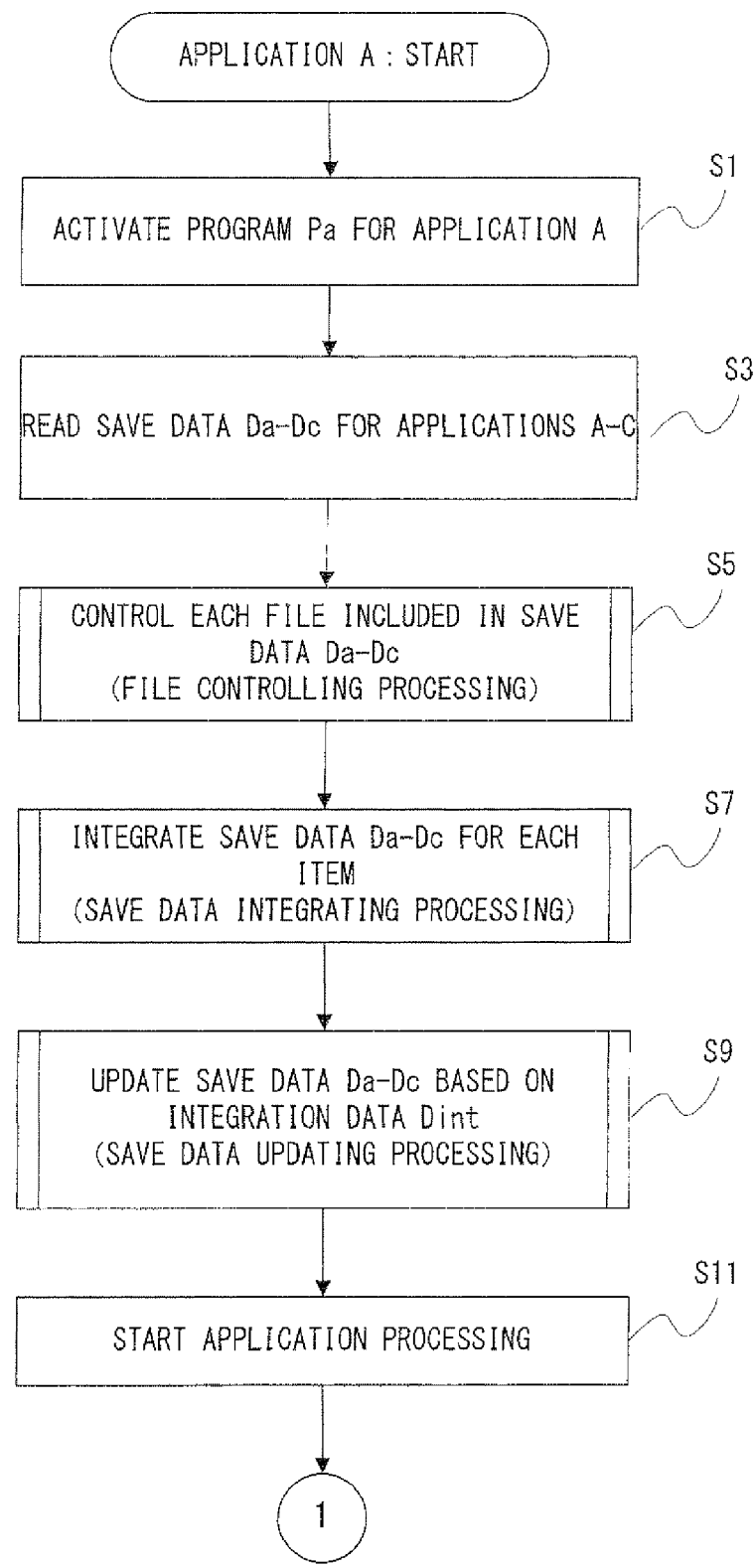
FIG. 13 is a flowchart showing a part of an operation of a CPU.
Figure 14:
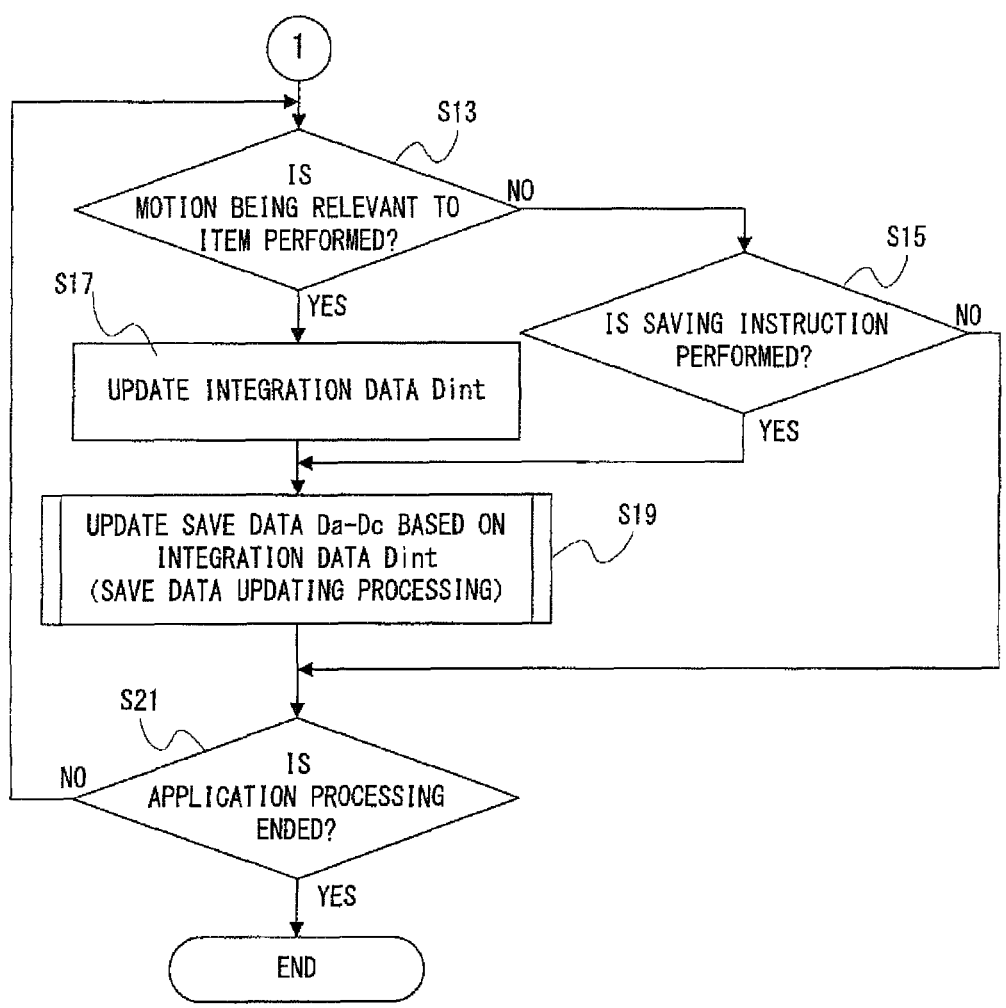
FIG. 14 is a flowchart showing another part of the operation of the CPU.

Referring first to FIG. 13 and FIG. 14, when the application A is selected through the application selection screen shown in. FIG. 6(A), the CPU 42 activates the program Pa for application A. After completion of the activating processing, the process proceeds to a step S3 to read the save data Da-Dc for applications A-C in the working area (not illustrated) of the main memory 48. Then, after controlling each file included in the save data Da-Dc in a step S5, and the save data Da-Dc are integrated for each item. The detail of the file controlling processing in the step S5 and the integrating processing in a step S7 are described later.

The result of the integrating processing, that is, the integrated save data Dint is stored in the data area 74 of the main memory 48. In a next step S9, the save data Da-Dc for applications A-C stored in the data area 72 of the memory for saved data 52 are overwritten with the integrated save data Dint. Noted that the detail of the save data overwriting processing in the step S9 is described later. After the updating, in a step S11, application processing is started. Here, the application processing is processing corresponding to the facial training explained according to FIG. 6(A)-FIG. 6(D), and is executed according to another flowchart not shown. Furthermore, the application processing is ended in response to an end operation, etc. via the operating portion 24, or when a predetermined end condition is satisfied.

Next, in a step S13, it is determined whether or not a motion (motion relevant to the item) being relevant to any one of the items described in the item table CT (see FIG. 9) is performed through the application processing, and if "YES" here, the process proceeds to a step S21 through steps S17-S19. If "NO" in the step S13, the process shifts to a step S15 to determine whether or not a saving instruction operation is performed by the operating portion 24 and via the touch panel 28, etc., and if "YES" here, the process proceeds to a step S21 through the step S19. If "NO" in the step S15, the process directly proceeds to the step S21.

In the step S17, the integrated save data Dint stored in the data area 74 is updated in response to the motion being relevant to the item being performed. In the succeeding step S19, the save data Da-Dc for applications A-C stored in the data area 72 are updated on the basis of the integrated save data Dint. Here, the save data overwriting processing in the step S19 is processing similar to that in the step S9, and is described later. Then, in the step S21, it is determined whether or not the application processing is ended, and if "NO", the process returns to the step S13 to repeat the similar processing. If "YES" in the step S21, the flowchart is ended.

Figure 15:
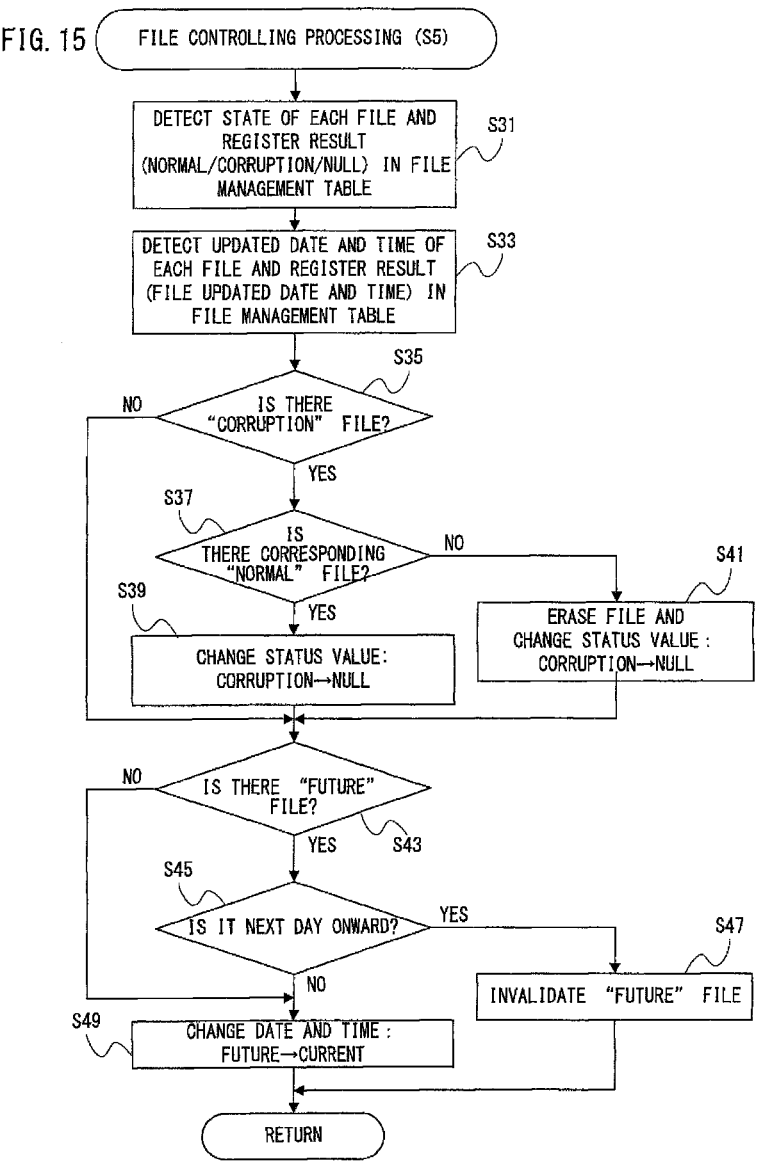
FIG. 15 is a flowchart showing a still another part of the operation of the CPU.

The file controlling processing in the above-described step S5 is executed according to a subroutine in FIG. 15. The CPU 42 detects the state of each file (see FIG. 8) included in the save data Da-Dc, and registers the result (normal/corruption/null) in the file management table MT in a first step S31. In a succeeding step S33, the updated date and time of each file is detected, and the result (file updated date and time) is registered in the file management table MT. It should be noted that the detailed detection method of the file state and the updated date and time is described before, and are thus omitted. At this time, the file management table MT is as shown in FIG. 12(A).

Thereafter, the process proceeds to a step S35 to determine whether or not there is a "corruption" file on the basis of the file management table MT, and if "NO", the process proceeds to a step S43. If "YES" in the step S35, the process proceeds to a step S37 to further determine whether or not there is a "normal" file corresponding to the "corruption" file on the basis of the file management table MT. Then, if "YES" in the step S37, the state of the "corruption" file is changed to the "null" in a step S39, and then the process proceeds to the step S43. On the other hand, if "NO" in the step S37, the "corruption" file is erased, and the state is changed to the "null" in a step S41. Then, the process proceeds to the step S43.

In the step S43, it is determined whether or not there is a "future" file on the basis of the file management table MT, and if "NO", the process proceeds to a step S49. If "YES" in the step S43, the process proceeds to a step S45 to determine whether or not the updated date and time of the "future" file is the next day onward with respect to the current date and time (this is a local current date and time of the game apparatus 10 based on the CRT 60) on the basis of the file management table MT. Then, if "YES" in the step S45, the "future" file is invalided in a step S47, and the process is restored to the main routine (see FIG. 13-FIG. 14). On the other hand, if "NO" in the step S45, the updated date and time of the "future" file is changed to the current date and time in a step S49, and then, the process is returned of the main routine. At this time, the file management table MT is as shown in FIG. 12(B).

Thus, prior to integrating the save data, the state and the updated date and time of each file is controlled on the file management table MT.

Figure 16:
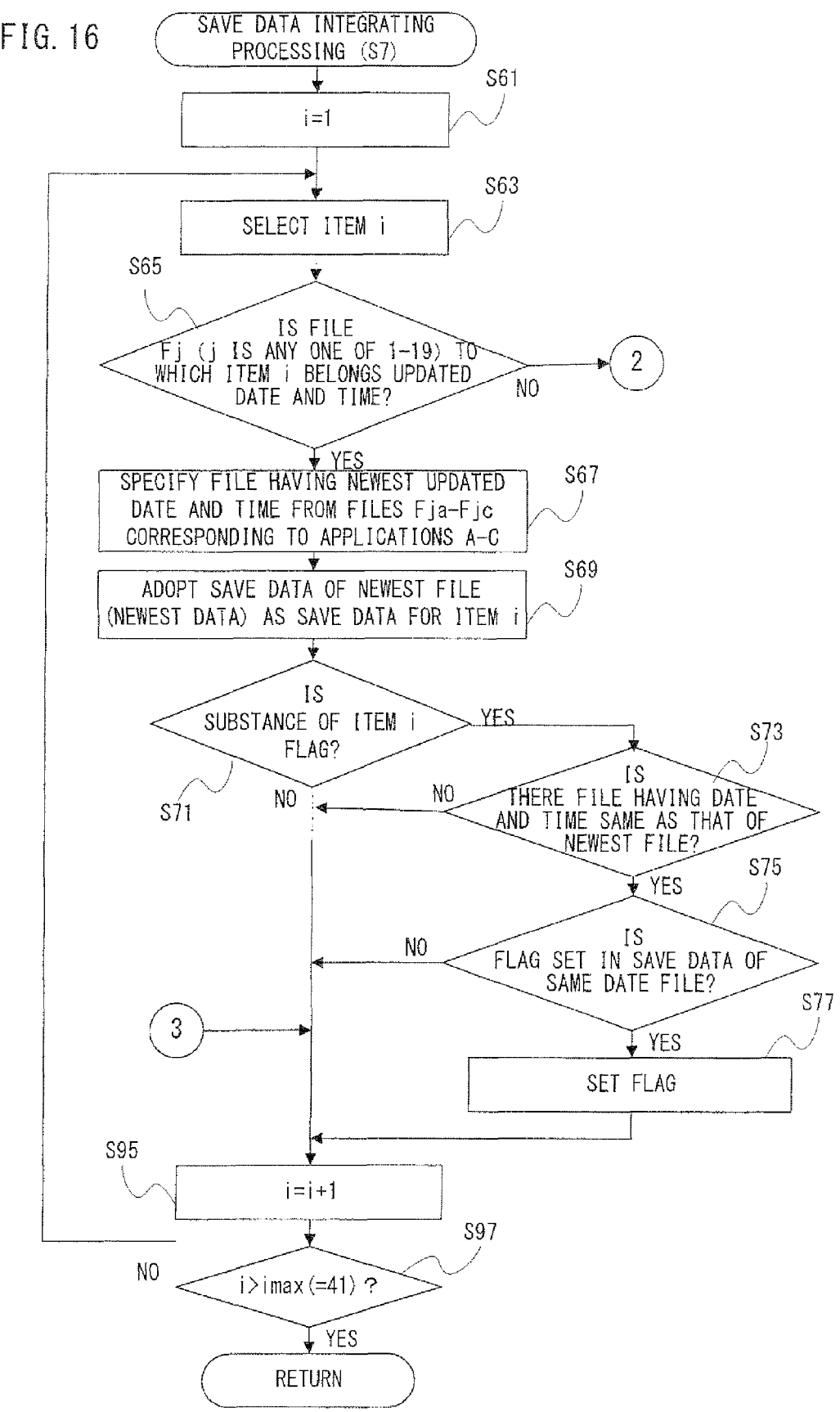
FIG. 16 is a flowchart showing a further part of the operation of the CPU.
Figure 17:
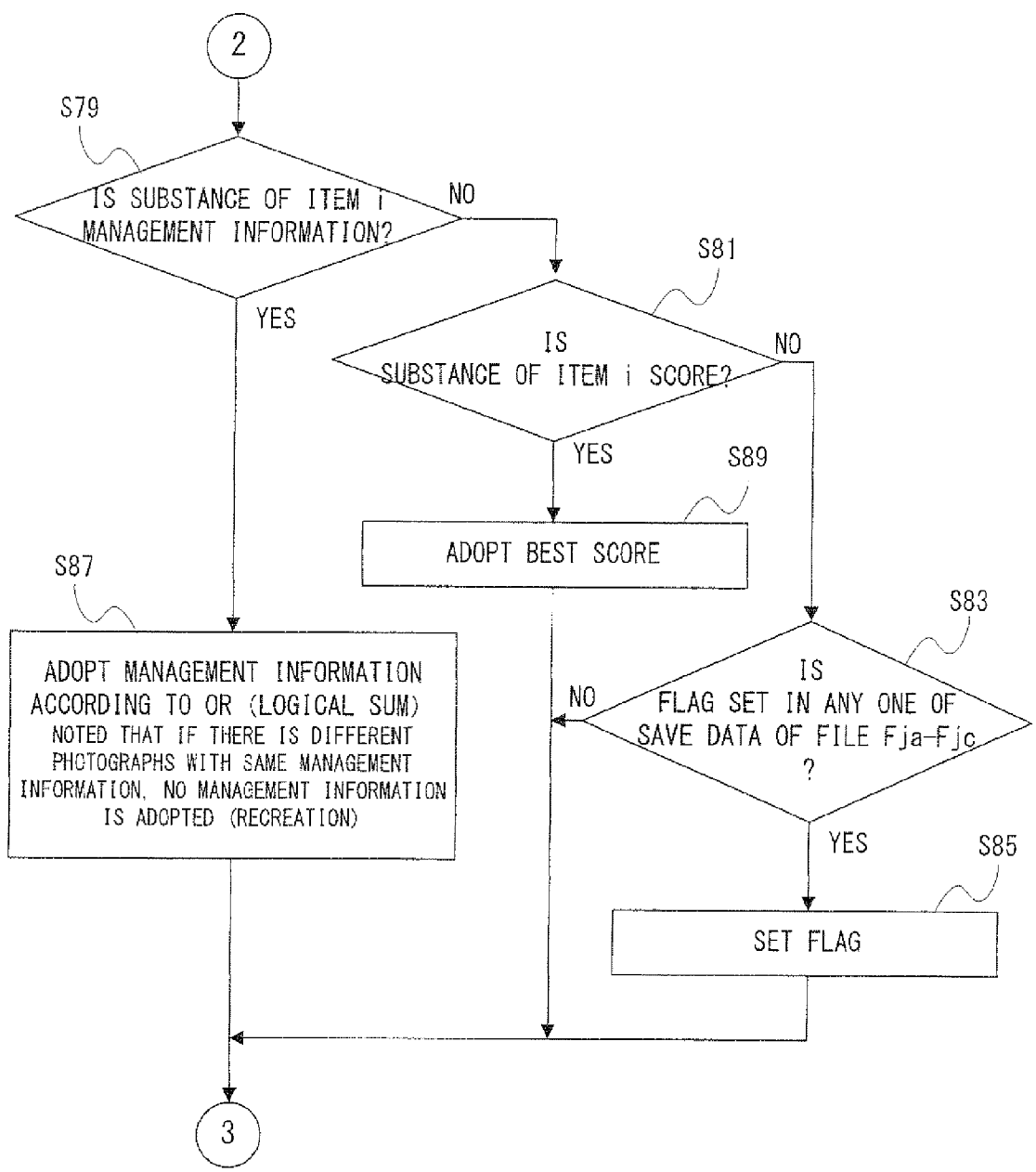
FIG. 17 is a flowchart showing another part of the operation of the CPU.

The save data integrating processing in the above-described step S7 is executed according to a subroutine according to FIG. 16-FIG. 17. The CPU 42 sets an initial value "1" to a variable i for identifying the items (41 items shown in FIG. 9 here) in a first step S61. Then, in a step S63, an item i is selected, and in a step S65, a file Fj (j is any one of 1-19: see FIG. 8) to which the item i belongs is specified to determine whether or not the file Fj is attached with an updated date and time. If "NO" here, the process shifts to a step S79 (step S79 and steps S81-S89 following therto is described later).

If "YES" in the step S65, the process proceeds to a step S67 to specify a file having the newest updated date and time out of the three files identified by the variable j, that is, the files Fja-Fjc corresponding to the applications A-C. Then, the save data of the newest file (newest data) is adopted as save data of the item i (see rule R1 or R2: FIG. 10) in a step S69. In addition, in a step S71, it is determined whether or not the substance of the item i is a flag, and if "NO", the processing of the item is ended, and the process proceeds to a step S95. That is, in a case that the substance is the thing other than the flag, the newest data is merely adopted in the integration (rule R2: see the item 41 in FIG. 11 for concrete example).

On the other hand, if "YES" in the step S73, it is determined whether or not the file (the same date file) having the date the same as that of the newest file is within the files Fja-Fjc in a step S75, and if "NO" here, the process proceeds to the step S95. If "YES" in the step S73, it is further determined whether or not the flag is set in the save data of the file with the same date (the same date data), and if "NO" here, the process proceeds to the step S95. If "YES" in the step S75, the flag is set in a step S77, and the process proceeds to the step S95. That is, in a case that the substance is a flag, in the integration, the newest data is adopted, but the flag set in the same date data is set (rule R1: see the item 40 in FIG. 11 for concrete example).

On the other hand, if the file Fj is not attached with the updated date and time (step S65:NO), it is determined whether or not the substance of the item i is the photograph managing information in a step S79, and if "NO" here, it is further determined whether or not the substance of the item i is a score in a step S81, and if "NO" here, the substance of the item is regarded as a flag, and the process shifts to a step S83. In the step S83, it is determined whether or not the flag is set in the save data of the files Fja-Fjc, and if "NO" here, the process proceeds to the step S95. If "YES" in the step S83, the flag is set in a step S85, and then, the process proceeds to the step S95. That is, in a case that the substance is a flag, if any flag is set in the integration, the flag is set (rule R3: see the item 1, 2 in FIG. 11 for concrete example).

If "YES" in the step S79, the process proceeds to a step S87 to adopt the photograph managing information included in the save data Da-Dc of the item i by the "OR", that is, the logical sum (rule R5). Accordingly, as the item 39 shown in FIG. 11, when the photograph managing information (imaging numbers) #1-#12 are included in the save data Da, the imaging numbers #1-#13 are included in the save data Db, and the imaging numbers #2-#13 are included in the save data Dc, the imaging numbers #1-#13 are adopted. Here, if out of three sheets of photographs identified with the imaging number #2, one sheet of photograph is different from the other two, for example, the imaging number #2 is not adopted (proviso of the rule R5), imaging number reattaching processing is performed on the three sheets of photographs. Then, the process proceeds to the step S95.

If "YES" in the step 81, the process proceeds to a step S89 to adopt the best score out of the scores included in the save data Da-Dc of the item i (rule R4: see item 32 in FIG. 11 for concrete example). Then, the process proceeds to the step S95.

In the step S95, the variable i is incremented. Then, in a step S97, it is determined whether or not the variable i is above a maximum value imax (41, here), and if "NO" here, the process returns to the step S63 to repeat the similar processing. If "YES" in the step S97, the process restored to the main routine.

It should be noted that in the flowchart shown in FIG. 16-FIG. 17, the rules applied for integrating the respective items are decided on the basis of the integration rule table RT (that is, by determining the attribute of the file and the substance of the item), but in a case that the integration rule of each item is described in the item table CT (see FIG. 9) in advance, the rule may be read from the item table CT.

Figure 18:
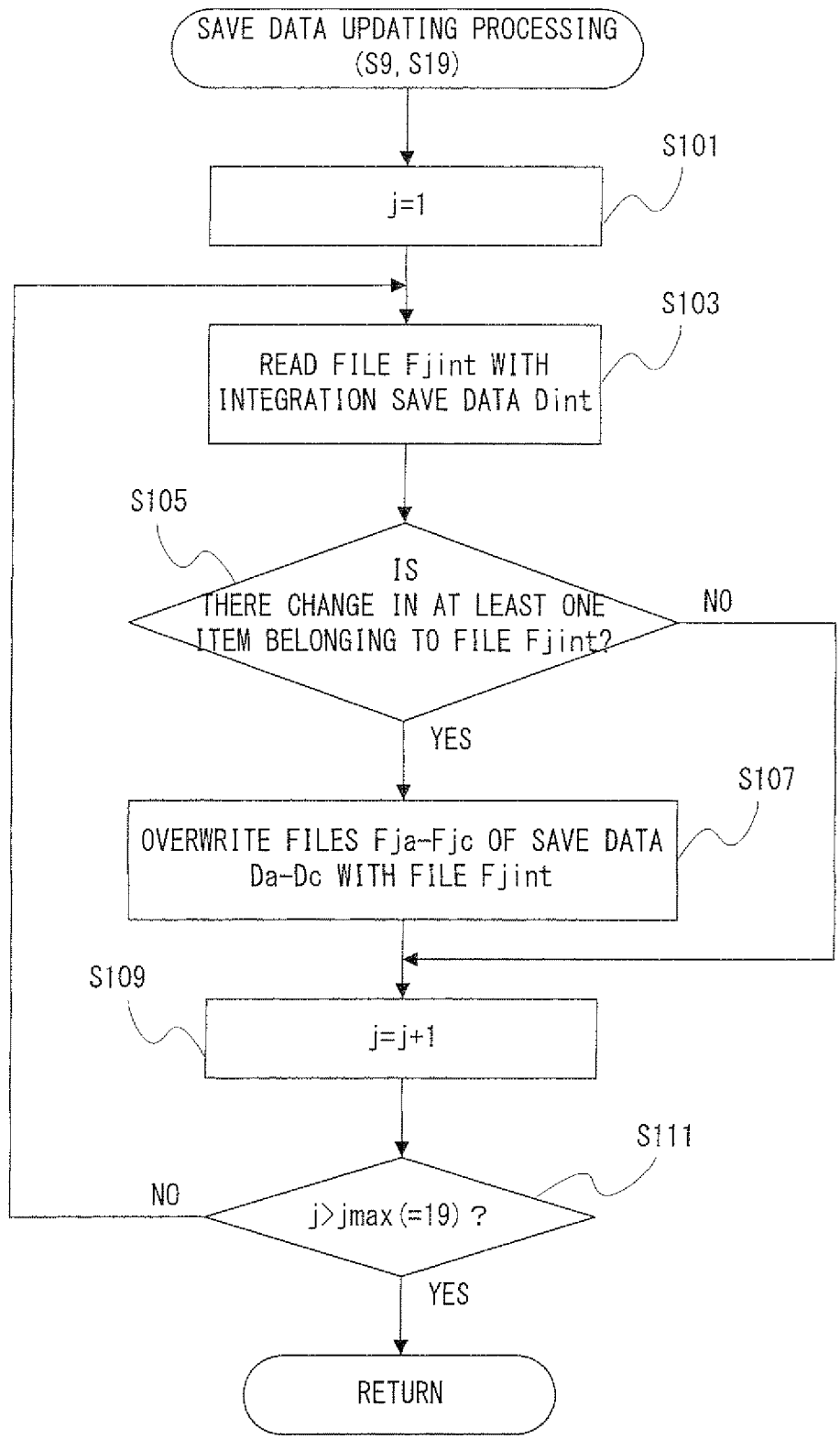
FIG. 18 is a flowchart showing a still another part of the operation of the CPU.

The save data overwriting processing in the above-described steps S9, S19 is executed according to the subroutine in FIG. 18. The CPU 42 sets an initial value "1" to a variable i for identifying the files (19 files shown in FIG. 8, here) in a first step S101. Then, in a step S103, the file Fjint of the integrated save data Dint is captured in the working area (not illustrated) of the main memory 48. Then, it is determined whether or not there is a change in at least one item belonging to the file Fjint in a step S105, and if "NO", the process proceeds to a step S109. If "YES" in the step S105, the files Fja-Fjc of the save data Da-Dc are overwritten with the file Fjint in a step S107, and then, the process proceeds to a step S109.

In the step S109, the variable j is incremented. Then, in a step S111, it is determined whether or not the variable j is above a maximum value j max (19 here), and if "NO" here and the process returns to the step S103 to repeat the same processing. If "YES" in the step S111, the process is restored to the main routine.

Thus, in updating, it is determined whether or not each file 1-19 includes a changed item, and only the file for which the determination result is "YES" is overwritten, so that it is possible to perform efficient overwriting by utilizing especially the NAND-type flash memory as a memory for saved data 52.

As understood from the above description, in the game apparatus 10 of this embodiment, the save data shared among the applications A-C (first-third applications) is stored as the save data Da-Dc (the first-third save data) in correspondence with the applications A-C in the memory for saved data 52 (storing means). The CPU 42 (computer) integrates within the main memory 48 the save data Da-Dc for applications A-C stored in the memory for saved data 52 when the application A is activated, for example (S7), updates the integration data Dint by execution of the application A (S17), and overwrites the save data Da-Dc stored in the memory for saved data 52 with the updated integration data Dint according to an automatic saving instruction and a saving instruction by the user (S19). Thus, it is possible to keep the save data shared among the applications A-C up to date without complex operations.

Furthermore, the CPU 42 executes the aforementioned integrating processing (S7) when activating the application, and overwrites the save data Da-Dc with the integration data Dint before the application processing starts to be executed (S9). Thus, when activating the application, the save data Da-Dc are integrated, and the integration result is reflected on the save data Da-Dc, so that it is possible to execute the application processing by the newest save data.

Furthermore, the CPU 42 restores the abnormality of the save data through the integrating processing by executing the controlling processing (S5) prior to the integrating processing (S7). Thus, even if abnormality occurs to the save data Da, if the save data Db or Dc is normal, the abnormality can be restored through the integrating processing and the updating processing.

Additionally, in this embodiment, the programs Pa-Pc for applications A-C and the save data Da-Dc are stored within the memory for saved data 52, but even when any one or two of the programs Pa-Pc is not stored at this time, the save data Da-Dc may be stored, and in this case, it is possible to reflect the effect of integration on each save data Da-Dc. For example, the integration is performed among the save data Da and Db, and the result can be reflected on the save data Da-Dc (overwrite the save data Da-Dc with the integration data Dint based on the save data Da and Db).

Furthermore, in this embodiment, the items are classified into groups to each of which one file is assigned, but one file may be assigned to one item without grouping, or all the items may be included into a single file. However, grouping allows more efficient overwriting.

Then, in this embodiment, the overwriting is performed by a file unit, but in another embodiment, this may be performed by an item unit. However, a memory allowing more precise overwriting control, such as a NOR-type flash memory, is required to be used as a memory for saved data.

Furthermore, in this embodiment, the save data Da-Dc for applications A-C stored in the memory for saved data 52 are integrated, and by utilizing the integration data Dint obtained through integration, any one of the applications A-C is executed, and the integration data Dint updated in response to execution of any one of the applications A-C overwrites the save data Da-Dc, but there is no need of being restricted to this. By using predetermined data stored in the memory for saved data 52, any one of the applications A-C is executed, and the predetermined data updated in response to execution of any one of the applications A-C overwrites the save data Da-Dc. In this case, the above-described predetermined data has data structure the same as the integration data Dint.

In the above description, the game apparatus 10 is explained, but this invention can be applied to an information processing apparatus (PC, PDA, cellular phone unit, etc.) having a computer (CPU) connected to a storing means (memory for saved data like a flash memory, hard disk, rewritable optical disk, etc.) for storing data (save data, history data, reference data, learn data, etc.) by respectively bringing at least the part of data shared among the applications A, B, C . . . into correspondence with the applications A, B, C as data Da, Db, Dc, . . . .

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing an information processing program comprising instructions that cause a computer connected to a storing device storing data to perform the following operations:
    storing a data structure comprising first game application data configured for use by the first game application and second game application data configured for use by the second game application different from the first game application;
    in accordance with integration rules, bringing integration data at least a part of which is shared between a first game application and a second game application into correspondence with: (a) gameplay by the first game application based at least in part on the stored first game application data, and (b) gameplay by the second game application based at least in part on the second stored game application data, including:
        reading the stored first game application data with the first game application;
        executing said first game application using the read first game application data;
        generating integration data in accordance with execution of said first game application;
    updating said stored first game application data with the generated integration data for use by the first game application; and
    updating the stored second game application data in accordance with the generated integration data for use by the second game application.

2. A storage medium storing an information processing program according to claim 1, wherein
    said information processing program causes said computer to integrate said first data and said second data stored in said storing device, and
    execute said first game application by integration data.

3. A storage medium storing an information processing program according to claim 1, wherein
    said overwriting overwrites said first data and said second data stored in said storing device by the first game application data updated in response to a predetermined instruction.

4. A storage medium storing an information processing program according to claim 2, wherein
    said information processing program causes said computer to activate said first game application, and
    perform integration when said first game application is activated.

5. A storage medium storing an information processing program according to claim 4, wherein
    said information processing program causes said computer to overwrite said first data and said second data stored in said storing device with the integration data when said first game application is activated, before execution of said first game application is started.

6. A storage medium storing an information processing program according to claim 5, wherein
    said information processing program causes said computer to overwrite a part different from the integration data out of said first data and/or said second data stored in said storing device.

7. A storage medium storing an information processing program according to claim 2, wherein
    a shared part of said data is divided into a plurality of items, and said computer integrates said first data and said second data for each item.

8. A storage medium storing an information processing program according to claim 7, wherein
each of said plurality of items belongs to any one of a plurality of groups to each of which one file is assigned, and
said computer overwrites said first data and said second data by a file unit.

9. A storage medium storing an information processing program according to claim 8, wherein
said computer determines whether or not a change occurs for all items included in each of said plurality of groups, and performs overwriting on the file corresponding to the group including at least one item for which a determination result is affirmative.

10. A storage medium storing an information processing program according to claim 8, wherein
said computer performs integration according to a rule corresponding to an attribute of each file and/or a substance of each item.

11. A storage medium storing an information processing program according to claim 10, wherein
said attribute is as to whether or not each file includes updated-date-and-time data, and
said rule includes a newest adopting rule of adopting data of a newest file if each file includes the updated-date-and-time data.

12. A storage medium storing an information processing program according to claim 10, wherein
said rule includes a flag rule of setting, in a case that the substance of the item is a flag in relation to proceeding of a game application, the flag if the flag is set in any one of data.

13. A storage medium storing an information processing program according to claim 10, wherein
said rule includes a highest value rule of adopting a highest value in a case that the substance of the item is a value.

14. A storage medium storing an information processing program according to claim 10, wherein
said rule includes a logical sum rule of perform adopting according to a logical sum in a case that the substance of the item is management information of data.

15. A storage medium storing an information processing program according to claim 14, wherein
said logical sum rule is attached with a condition that if there is different data of the same management information, no data is adopted.

16. A storage medium storing an information processing program according to claim 3, wherein said predetermined instruction includes an automatic saving instruction.

17. A storage medium storing an information processing program according to claim 1, wherein said data is data indicating a parameter being in relation to and changing in accordance with execution of each of said first game application and said second game application.

18. A storage medium storing an information processing program according to claim 2, wherein
said information processing program causes said computer to further control said integration such that in a case that a fault occurs to said first data stored in said storing device, said fault is restored by utilizing said second data stored in said storing device.

19. A storage medium storing an information processing program according to claim 18, wherein
said computer changes, in a case that updated-date-and-time data corresponding to said first data is a future and a same day with respect to a current date and time, the updated-date-and-time data so as to indicate the current date and time, and invalidating said first data in a case that the updated-date-and-time data indicates a future and a next day onward.

20. An information processing apparatus, comprising:
a storing device for storing data at least a part of which is shared between a first game application and a second game application as first data by bringing it into correspondence with said first game application and as second data by bringing it into correspondence with said second game application;
a processor for executing said first game application with predetermined data;
the game application-executing processor providing a data updater for updating said predetermined data in accordance with execution of said first game application; and
the game application-executing processor further comprising a first overwriter for updating said first data and said second data which are stored in said storing device with the predetermined data updated by said data updater, the first game application using only a portion of the stored data and updating stored data other than said portion updating the stored second game application data in accordance with the generated integration data for use by the second game application.

21. An information processing method of an information processing apparatus having a storing device and at least one processor, the method performed by the at least one processor comprising:
storing a data structure at least a part of which is shared between a first game application and a second game application different from the first game application, the stored data structure comprising first game application data configured for use by the first game application and second game application data configured for use by the second game application;
in accordance with integration rules, bringing integration data at least a part of which is shared between the first game application and the second game application into correspondence with (a) gameplay by said first game application based at least in part of the stored first game application data, and (b) gameplay by the second game application based at least in part on the second stored game application data, including
reading the stored first game application data with the first game application;
executing said first game application by using the read first game application data;
generating integration data in accordance with execution of said first game application; and
updating said first game application data with the generated integration data for use by the first game application; and
updating the stored second game application data in accordance with the generated integration data for use by the second game application.

22. An information processing apparatus, comprising:
a storing device configured to store a data structure at least a part of which is shared between a first game application and a second game application different from the first game application, the data structure comprising first game application data configured for use by a first game application and second game application data configured for use by a second game application different from the first game application;
a processor configured to, in accordance with integration rules, bring integration data at least a part of which is shared between the first game application and the second game application into correspondence with (a) gameplay by said first game application based at least in part on the stored first game application data, and (b) gameplay by the second game application based at least in part on the second stored game application data, the processor being configured to;

read the stored first game application data with the first game application;

execute said first game application using the read first game application data;

generate integration data in accordance with execution of the first game application;

update said stored first game application data with the generated integration data for use by the first game application; and update said stored second game application data in accordance with the generated integration data for use by the second game application, the first game application using only a portion of the stored data structure and updating portions of the stored data structure other than said second game application data.

23. A computer processing system including a file system for updating save data, comprising:

storage device access structure configured to be operatively connected to a non-volatile storage device which retains a data structure comprising first game application save data for use by a first game application and second game application save data for use by a second game application different from the first game application; and a computer processor operatively connected to the storage device access structure and configured to a execute a program comprising instructions to provide:

a data reader that, in response to execution of the first game application reads from the non-volatile save data storage device both first game application save data for use by the first game application and second game application save data for use by a second game application different from the first game application, a data updater that updates, in response to execution of the first game application, those portions of each of the first and second game application save data read by the data reader that are shared by the first and second game applications and also updates game application save data portions not used by the first game application but which are instead for use by the second game application, an integration data generator that generates integration data, at least a part of which is shared between the first game application and the second game application, in accordance with execution of said first game application and brings the integration data into correspondence with (a) gameplay by the first game application based at least in part on the stored first game application data, and (b) gameplay by the second game application based at least in part on the stored second game application data, and a data writer that overwrites the updated portions of the first and second game application save data in the non-volatile storage device with the generated integration data to thereby keep up-to-date shared game application save data the non-volatile storage device retains for use by the first and second game applications.

24. A non-transitory storage medium storing an information processing program according to claim 1, wherein the information processing program further comprises instructions that cause the computer connected to the storing device storing data to perform the additional operation of storing the same data as the stored first game application data and as the stored second game application data.

25. A non-transitory storage medium storing an information processing program according to claim 1, wherein the operation of overwriting said stored first data and said stored second data with the updated first game application data is performed in response to a saving instruction by the user.

\* \* \* \* \*